US012613928B2

(12) United States Patent
Chao et al.

(10) Patent No.: US 12,613,928 B2
(45) Date of Patent: Apr. 28, 2026

(54) DATA LISTING SEARCH UTILIZING LARGE LANGUAGE MODELS

(71) Applicant: Snowflake Inc., Bozeman, MT (US)

(72) Inventors: Robert K. Chao, Fremont, CA (US); Christophe Gaboury, Belmont, CA (US); Theodore Kent Hamilton, Zurich (CH); Neeraj Khanna, Fremont, CA (US); Orestis Kostakis, Redmond, WA (US); Adil Lalani, Oakland, CA (US); Justin Langseth, Kailua, HI (US); Haoyue Liu, Kirkland, WA (US); Arun Muniyandi, Herndon, VA (US); Andriy Stasyuk, Bellevue, WA (US); Xin Wen, San Mateo, CA (US)

(73) Assignee: Snowflake Inc., Menlo Park, CA (US)

( * ) Notice: Subject to any disclaimer, the term of this patent is extended or adjusted under 35 U.S.C. 154(b) by 0 days.

(21) Appl. No.: 18/224,443

(22) Filed: Jul. 20, 2023

(65) Prior Publication Data

US 2024/0403373 A1      Dec. 5, 2024

Related U.S. Application Data

(60) Provisional application No. 63/469,777, filed on May 30, 2023.

(51) Int. Cl.
| | |
|---|---|
| *G06F 16/9532* | (2019.01) |
| *G06F 16/9538* | (2019.01) |
| *G06F 40/166* | (2020.01) |
| *G06F 40/242* | (2020.01) |
| *G06F 40/40* | (2020.01) |

(52) U.S. Cl.
CPC ...... *G06F 16/9532* (2019.01); *G06F 16/9538* (2019.01); *G06F 40/166* (2020.01); *G06F 40/242* (2020.01); *G06F 40/40* (2020.01)

(58) Field of Classification Search
CPC ............. G06F 16/9532; G06F 16/9538; G06F 40/166; G06F 40/40; G06F 40/242
See application file for complete search history.

(56) References Cited

U.S. PATENT DOCUMENTS

| | | | | |
|---|---|---|---|---|
| 7,856,350 B2 * | 12/2010 | Zhou | ...................... | G06F 40/30 |
| | | | | 707/738 |
| 8,271,502 B2 * | 9/2012 | Svore | .................. | G06F 16/9032 |
| | | | | 707/748 |
| 9,501,569 B2 * | 11/2016 | Song | ..................... | G06F 16/951 |
| 9,819,689 B2 * | 11/2017 | Chandola | .......... | G06F 16/24578 |
| 10,200,248 B1 * | 2/2019 | Jiang | ................... | H04L 41/0879 |
| 11,373,146 B1 * | 6/2022 | Yerastov | ............... | G06N 20/00 |
| 11,765,207 B1 * | 9/2023 | McCarthy | ............... | G06F 40/40 |

(Continued)

*Primary Examiner* — Mark E Hershley

(74) *Attorney, Agent, or Firm* — Womble Bond Dickinson (US) LLP

(57)      ABSTRACT

A search engine of a data exchange may receive a query comprising a set of search terms, retrieve a plurality of data listings based on the search terms of the query, compare a first embedding generated by a large language model (LLM) from the search query to second embeddings generated by the LLM for each of the plurality of data listings to determine a respective relevance for each of the plurality of data listings to the search query, and rank the plurality of data listings based on the respective relevance for each of the plurality of data listings to the search query.

30 Claims, 21 Drawing Sheets

(56) References Cited

U.S. PATENT DOCUMENTS

| | | | | |
|---|---|---|---|---|
| 11,893,341 | B2 * | 2/2024 | Itani | G06F 3/0482 |
| 11,977,854 | B2 * | 5/2024 | Tunstall-Pedoe | G06N 3/0442 |
| 11,977,959 | B2 * | 5/2024 | Krasner | G06F 18/23213 |
| 12,166,503 | B1 * | 12/2024 | Halabi | G06Q 10/06 |
| 2010/0138414 | A1 * | 6/2010 | Newman | G06F 16/951 |
| | | | | 707/E17.014 |
| 2011/0238662 | A1 * | 9/2011 | Shuster | G06F 16/248 |
| | | | | 707/E17.071 |
| 2016/0012465 | A1 * | 1/2016 | Sharp | G06Q 20/321 |
| | | | | 705/14.17 |
| 2016/0253382 | A1 * | 9/2016 | Shadmon | G06F 16/2453 |
| | | | | 707/718 |
| 2019/0068171 | A1 * | 2/2019 | Li | H03H 21/0043 |
| 2020/0364516 | A1 * | 11/2020 | Krasner | G06F 18/23213 |
| 2021/0225526 | A1 * | 7/2021 | Viswanathan | G06F 16/24578 |
| 2021/0357869 | A1 * | 11/2021 | Wadhwa | G06Q 10/1053 |
| 2022/0130493 | A1 * | 4/2022 | Turner | G16H 70/40 |
| 2023/0244869 | A1 * | 8/2023 | Neumann | G06F 40/284 |
| | | | | 382/176 |
| 2023/0252233 | A1 * | 8/2023 | Gutierrez | G06F 40/20 |
| | | | | 704/9 |
| 2023/0297860 | A1 * | 9/2023 | Hosseini | G06F 16/275 |
| | | | | 706/12 |
| 2023/0316003 | A1 * | 10/2023 | Friedman | G06N 3/0442 |
| | | | | 704/9 |
| 2023/0316006 | A1 * | 10/2023 | Tunstall-Pedoe | G06F 40/56 |
| | | | | 704/9 |
| 2023/0359789 | A1 * | 11/2023 | Andre | G06F 30/27 |
| 2023/0367960 | A1 * | 11/2023 | Smus | G06F 40/56 |
| 2023/0367973 | A1 * | 11/2023 | Konam | G06F 40/40 |
| 2023/0368284 | A1 * | 11/2023 | Sheikh | G06Q 20/0855 |
| 2023/0385026 | A1 * | 11/2023 | El Hattami | G06F 8/30 |
| 2024/0004908 | A1 * | 1/2024 | Tran | G06F 16/9535 |
| 2024/0152546 | A1 * | 5/2024 | Oleson | G06F 16/953 |
| 2024/0160902 | A1 * | 5/2024 | Padgett | G06N 3/0895 |
| 2024/0289361 | A1 * | 8/2024 | Batina | G06F 16/3328 |
| 2024/0311348 | A1 * | 9/2024 | Lutz | G06F 16/258 |
| 2024/0394769 | A1 * | 11/2024 | Solmaz | G06Q 30/0629 |
| 2024/0403373 | A1 * | 12/2024 | Chao | G06F 16/9538 |

* cited by examiner

100

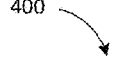
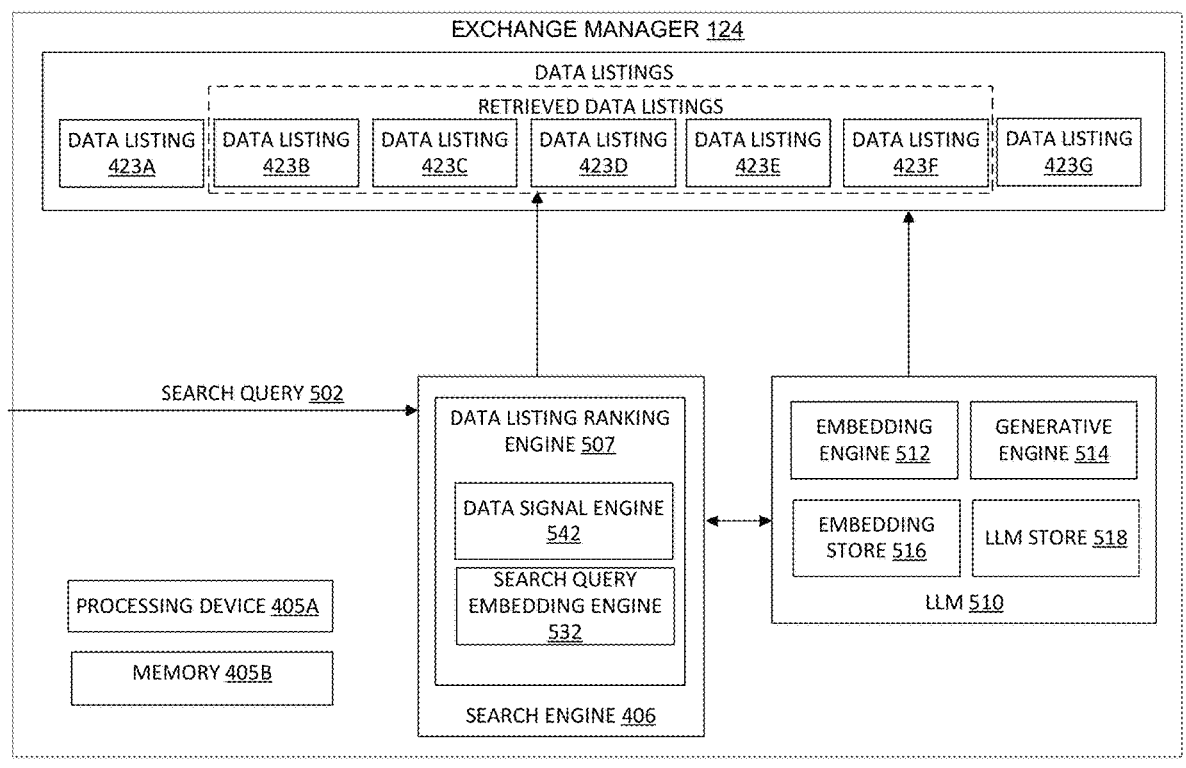
FIG. 5

600

GENERATE EMBEDDINGS FOR EACH DATA LISTING — 601

RECEIVE A SEARCH QUERY COMPRISING A SET OF SEARCH TERMS — 602

GENERATE EMBEDDING FOR THE SET OF SEARCH TERMS — 603

DETERMINE NEAREST NEIGHBORS TO SEARCH TERMS — 604

ADJUST RESULTS BASED ON DATA LISTING SIGNALS — 605

PROVIDE RESULTS IN RESPONSE TO SEARCH QUERY — 606

610

GENERATE EMBEDDINGS FOR EACH DATA LISTING — 601

RECEIVE A SEARCH QUERY COMPRISING A SET OF SEARCH TERMS — 602

GENERATE EMBEDDINGS FOR THE SET OF SEARCH TERMS — 603

DETERMINE NEAREST NEIGHBORS TO SEARCH TERMS — 604

ADJUST RESULTS BASED ON DATA LISTING SIGNALS — 605

GENERATE LISTING EXPLANATION FOR EACH RESULT — 611

PROVIDE RESULTS AND EXPLANATION IN RESPONSE TO SEARCH QUERY — 612

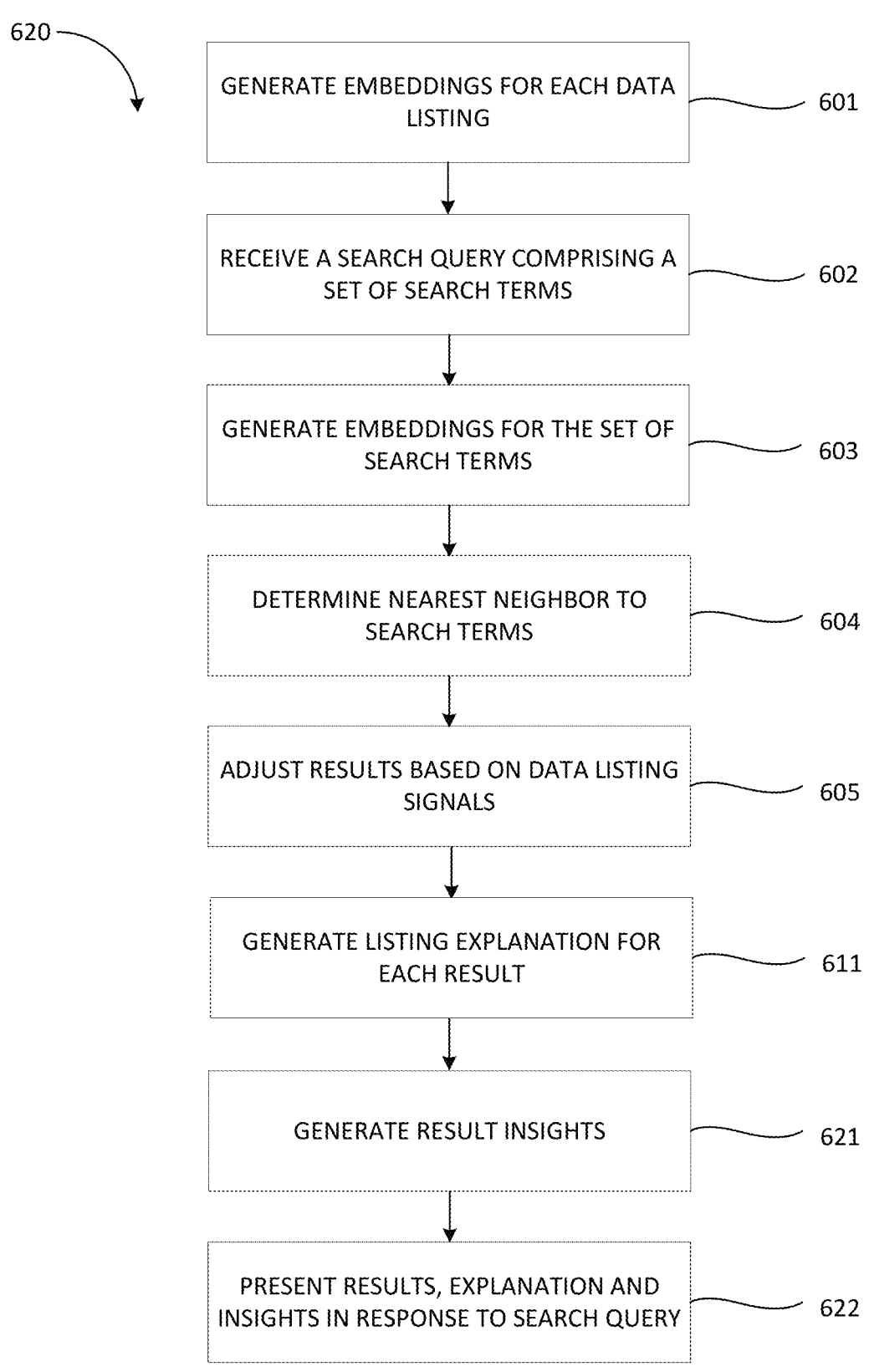

620

GENERATE EMBEDDINGS FOR EACH DATA LISTING — 601

RECEIVE A SEARCH QUERY COMPRISING A SET OF SEARCH TERMS — 602

GENERATE EMBEDDINGS FOR THE SET OF SEARCH TERMS — 603

DETERMINE NEAREST NEIGHBOR TO SEARCH TERMS — 604

ADJUST RESULTS BASED ON DATA LISTING SIGNALS — 605

GENERATE LISTING EXPLANATION FOR EACH RESULT — 611

GENERATE RESULT INSIGHTS — 621

PRESENT RESULTS, EXPLANATION AND INSIGHTS IN RESPONSE TO SEARCH QUERY — 622

*FIG. 6C*

Figures 10A, 10B:
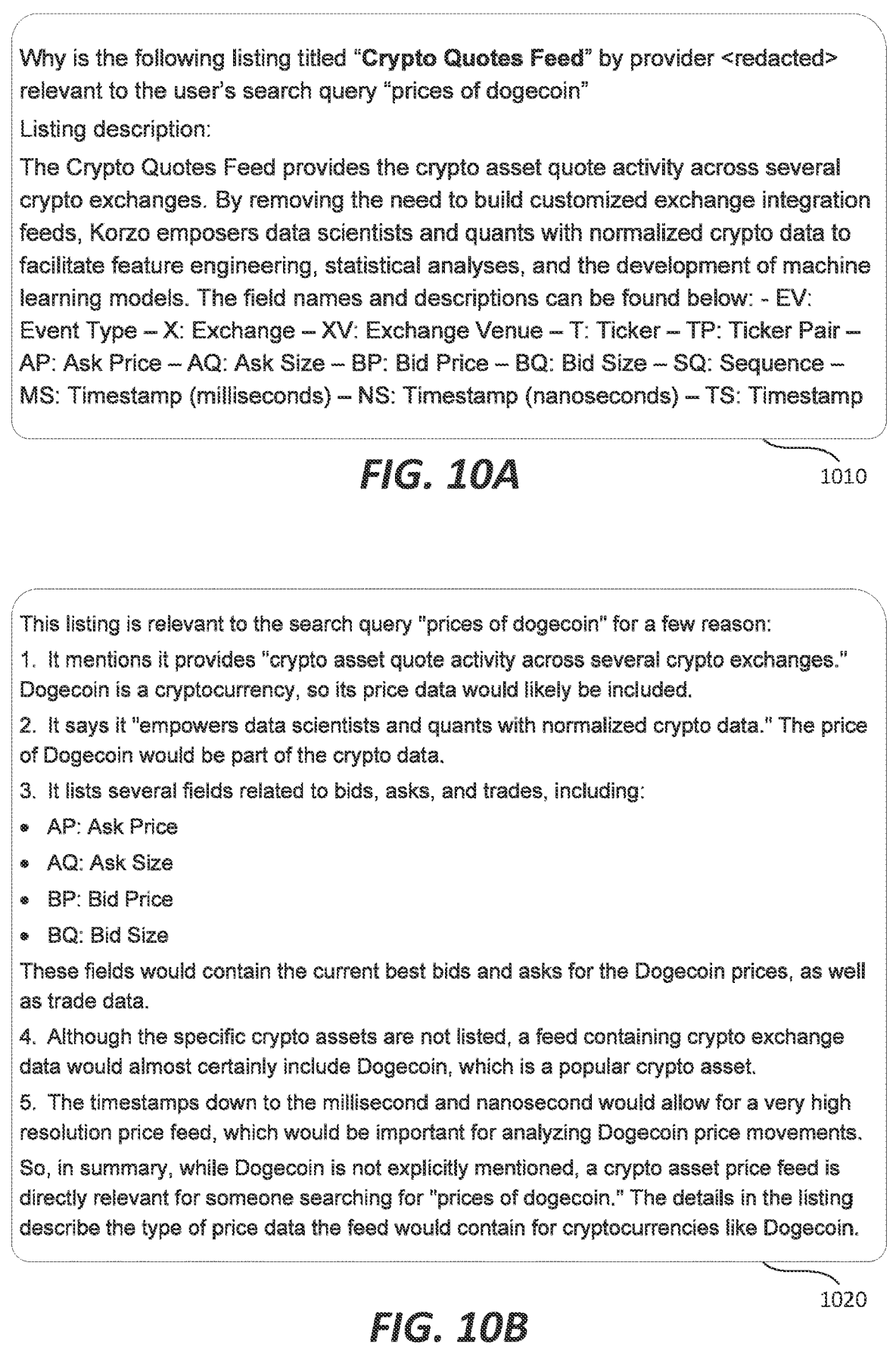

Why is the following listing titled "Crypto Quotes Feed" by provider <redacted> relevant to the user's search query "prices of dogecoin"

Listing description:

The Crypto Quotes Feed provides the crypto asset quote activity across several crypto exchanges. By removing the need to build customized exchange integration feeds, Korzo emposers data scientists and quants with normalized crypto data to facilitate feature engineering, statistical analyses, and the development of machine learning models. The field names and descriptions can be found below: - EV: Event Type – X: Exchange – XV: Exchange Venue – T: Ticker – TP: Ticker Pair – AP: Ask Price – AQ: Ask Size – BP: Bid Price – BQ: Bid Size – SQ: Sequence – MS: Timestamp (milliseconds) – NS: Timestamp (nanoseconds) – TS: Timestamp

*FIG. 10A*                                    1010

This listing is relevant to the search query "prices of dogecoin" for a few reason:

1. It mentions it provides "crypto asset quote activity across several crypto exchanges." Dogecoin is a cryptocurrency, so its price data would likely be included.

2. It says it "empowers data scientists and quants with normalized crypto data." The price of Dogecoin would be part of the crypto data.

3. It lists several fields related to bids, asks, and trades, including:

- AP: Ask Price
- AQ: Ask Size
- BP: Bid Price
- BQ: Bid Size

These fields would contain the current best bids and asks for the Dogecoin prices, as well as trade data.

4. Although the specific crypto assets are not listed, a feed containing crypto exchange data would almost certainly include Dogecoin, which is a popular crypto asset.

5. The timestamps down to the millisecond and nanosecond would allow for a very high resolution price feed, which would be important for analyzing Dogecoin price movements.

So, in summary, while Dogecoin is not explicitly mentioned, a crypto asset price feed is directly relevant for someone searching for "prices of dogecoin." The details in the listing describe the type of price data the feed would contain for cryptocurrencies like Dogecoin.

Figures 11A, 11B:
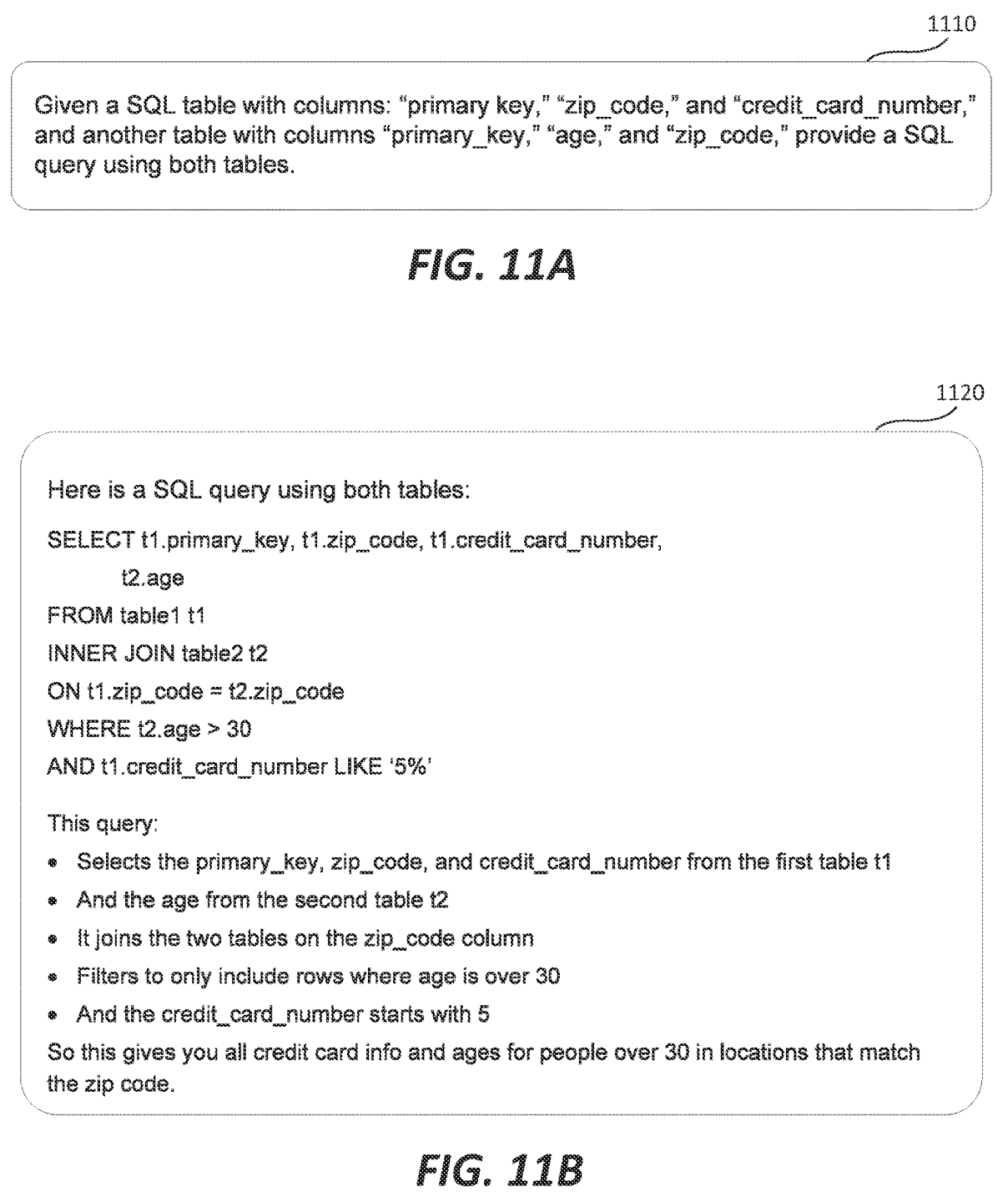

Given a SQL table with columns: "primary key," "zip_code," and "credit_card_number," and another table with columns "primary_key," "age," and "zip_code," provide a SQL query using both tables.

Here is a SQL query using both tables:

SELECT t1.primary_key, t1.zip_code, t1.credit_card_number,
        t2.age
FROM table1 t1
INNER JOIN table2 t2
ON t1.zip_code = t2.zip_code
WHERE t2.age > 30
AND t1.credit_card_number LIKE '5%'

This query:

● Selects the primary_key, zip_code, and credit_card_number from the first table t1
● And the age from the second table t2
● It joins the two tables on the zip_code column
● Filters to only include rows where age is over 30
● And the credit_card_number starts with 5

So this gives you all credit card info and ages for people over 30 in locations that match the zip code.

Given a SQL table with columns: "primary key," "zip_code," and "credit_card_number," and another table with columns "primary_key," "age," and "zip_code," provide a SQL query using both tables. Just provide the query with no other explanation or text

```
SELECT t1.primary_key, t1.zip_code, t1.credit_card_number, t2.age
FROM table1 t1
INNER JOIN table2 t2
ON t1.zip_code = t2.zip_code WHERE t2.age > 30
AND t1.credit_card_number LIKE '5%'
```

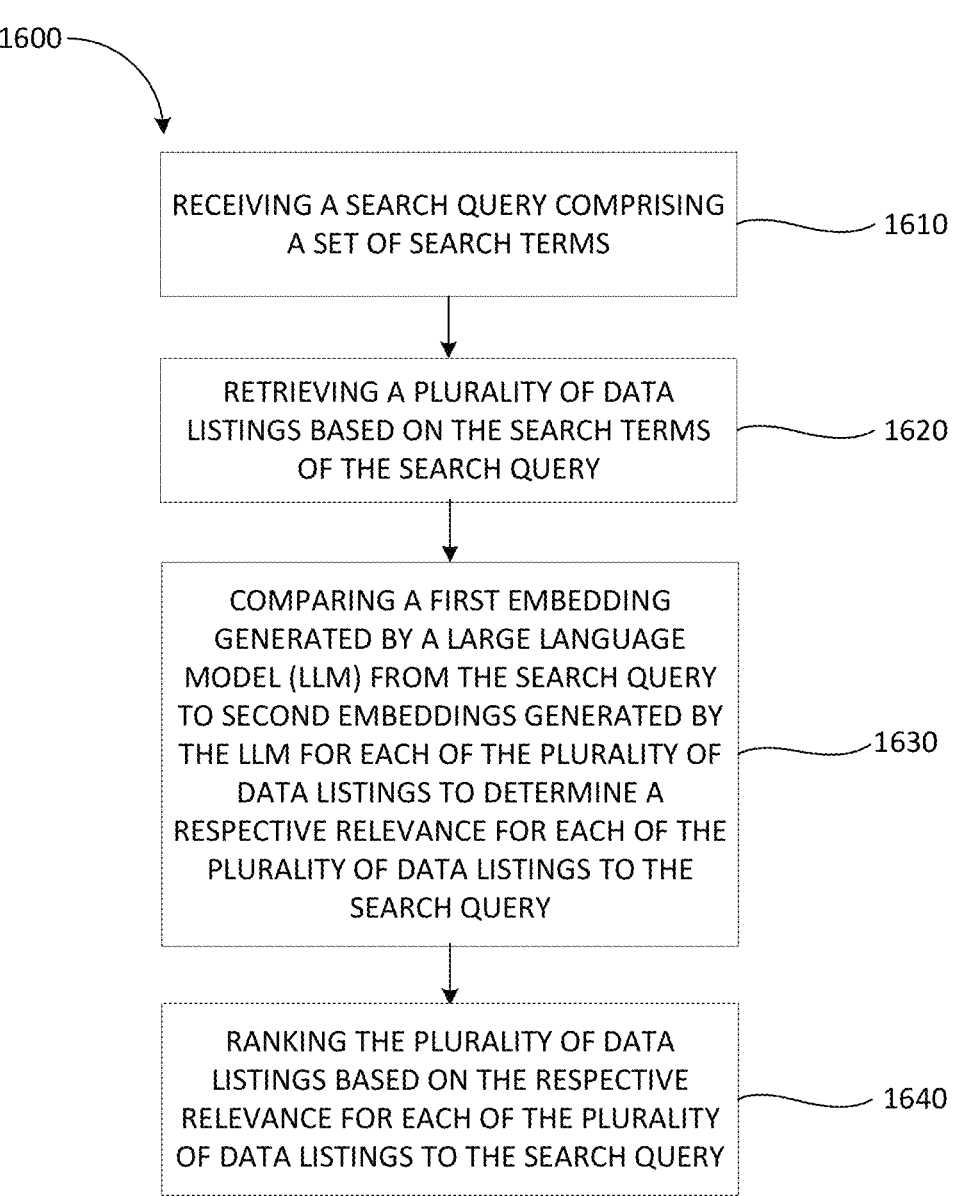

1600

RECEIVING A SEARCH QUERY COMPRISING A SET OF SEARCH TERMS — 1610

RETRIEVING A PLURALITY OF DATA LISTINGS BASED ON THE SEARCH TERMS OF THE SEARCH QUERY — 1620

COMPARING A FIRST EMBEDDING GENERATED BY A LARGE LANGUAGE MODEL (LLM) FROM THE SEARCH QUERY TO SECOND EMBEDDINGS GENERATED BY THE LLM FOR EACH OF THE PLURALITY OF DATA LISTINGS TO DETERMINE A RESPECTIVE RELEVANCE FOR EACH OF THE PLURALITY OF DATA LISTINGS TO THE SEARCH QUERY — 1630

RANKING THE PLURALITY OF DATA LISTINGS BASED ON THE RESPECTIVE RELEVANCE FOR EACH OF THE PLURALITY OF DATA LISTINGS TO THE SEARCH QUERY — 1640

*FIG. 16*

DATA LISTING SEARCH UTILIZING LARGE LANGUAGE MODELS

CROSS-REFERENCE TO RELATED APPLICATIONS

This application claims the benefit of U.S. Provisional Application No. 63/469,777, filed on May 30, 2023, the entire content of which is hereby incorporated by reference herein.

TECHNICAL FIELD

The present disclosure relates to data sharing platforms, and particularly to searching and ranking data sets within a data sharing platform.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 is a schematic diagram illustrating additional details of the cloud environment comprising the cloud deployment of FIG. 4A, where data listing search and ranking techniques are performed utilizing a large language model (LLM), in accordance with some embodiments of the present disclosure.

FIG. 6C is a flow diagram of an additional method of ranking search results, according to some embodiments of the present disclosure.

FIG. 10A is an example query that may be provided to the generative engine to generate the listing explanation of FIG. 9, in accordance with some embodiments of the present disclosure.

FIG. 10B is an example response that may be provided by the generative engine in response to the query of FIG. 10A.

FIG. 11A is an example query that may be provided to the generative engine to generate a usage example for inclusion in the listing explanation of FIG. 9, in accordance with some embodiments of the present disclosure.

FIG. 11B is an example response that may be provided by the generative engine in response to the query of FIG. 11A.

FIG. 12A is an example query that may be provided to the generative engine to generate a usage example for inclusion in the listing explanation of FIG. 9, in accordance with some embodiments of the present disclosure.

FIG. 12B is an example response that may be provided by the generative engine in response to the query of FIG. 12A.

FIG. 16 is a flow diagram of a method for enhanced data listing search and ranking, in accordance with some embodiments of the present disclosure.

DETAILED DESCRIPTION

Figure 1A:
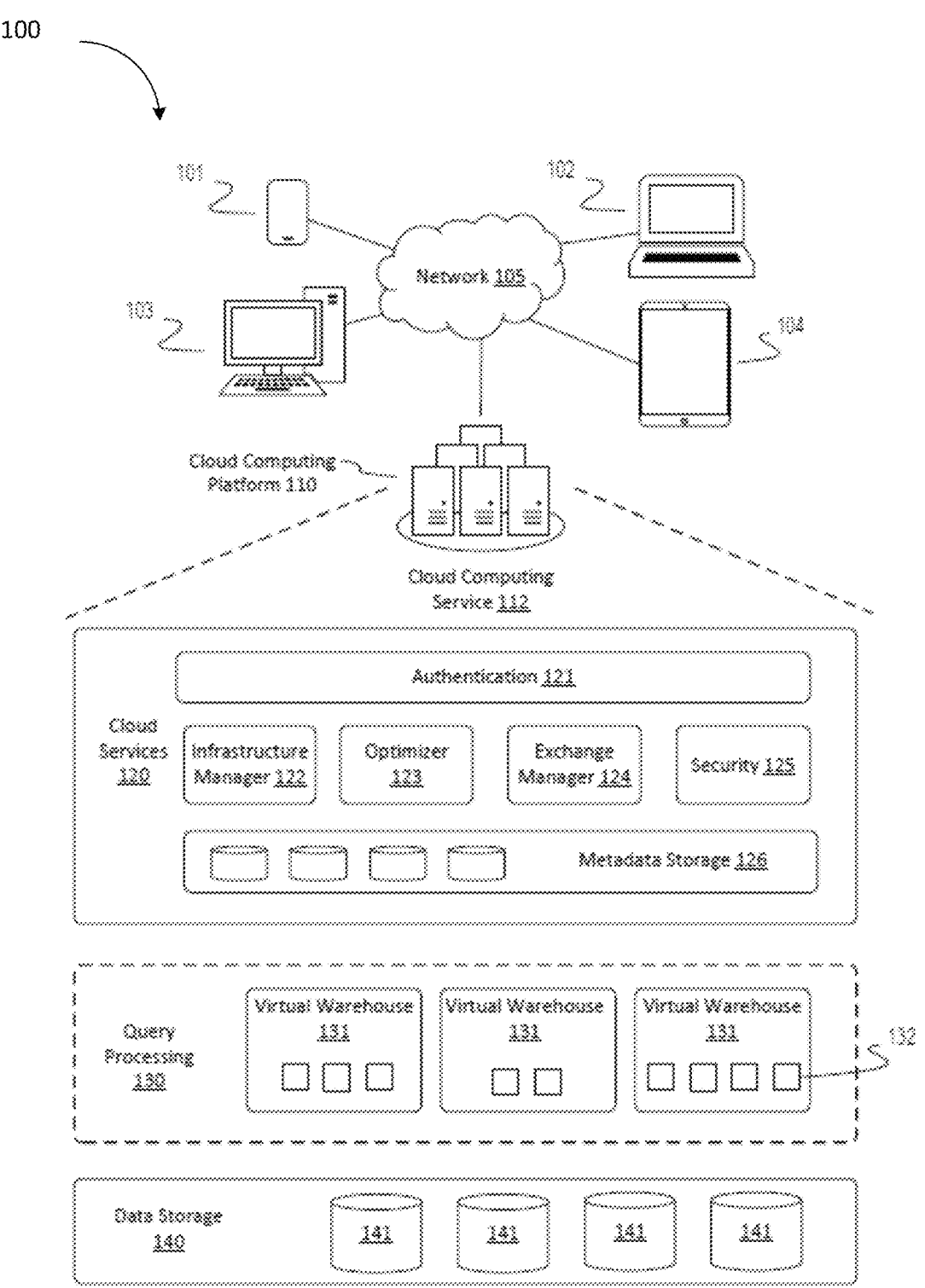
FIG. 1A is a block diagram depicting an example computing environment in which the methods disclosed herein may be implemented, in accordance with some embodiments of the present disclosure.

Data providers often have data assets that are cumbersome to share, but of interest to another entity. For example, a large online retail company may have a data set that includes the purchasing habits of millions of consumers over the last ten years. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This has several disadvantages. First, it is slow as copying terabytes or petabytes of data can take days. Second, once the data is delivered, the provider cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, more nimble cloud-focused startups are often priced out of accessing this data, even though the data may be valuable to their businesses. This may be because raw data assets are generally too unpolished and full of potentially sensitive data to simply outright sell/provide to other companies. Data cleaning, de-identification, aggregation, joining, and other forms of data enrichment need to be performed by the owner of data before it is shareable with another party. This is time-consuming and expensive. Finally, it is difficult to share data assets with many entities because traditional data sharing methods do not allow scalable sharing for the reasons mentioned above. Traditional sharing methods also introduce latency and delays in terms of all parties having access to the most recently-updated data.

Private and public data exchanges may allow data providers to more easily and securely share their data assets with other entities. A public data exchange (also referred to herein as a "Snowflake data marketplace," or a "data marketplace") may provide a centralized repository with open access where a data provider may publish and control live and read-only data sets to thousands of consumers. A private data exchange (also referred to herein as a "data exchange") may be under the data provider's brand, and the data provider may control who can gain access to it. The data exchange may be for internal use only, or may also be opened to consumers, partners, suppliers, or others. The data provider may control what data assets are listed as well as control who has access to which sets of data. This allows for a seamless way to discover and share data both within a data provider's organization and with its business partners.

The data exchange may be facilitated by a cloud computing service such as the SNOWFLAKE™ cloud computing service, and allows data providers to offer data assets directly from their own online domain (e.g., website) in a private online marketplace with their own branding. The data exchange may provide a centralized, managed hub for an entity to list internally or externally-shared data assets, inspire data collaboration, and also to maintain data governance and to audit access. With the data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities, thus becoming a Data Supplier or Data Provider. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: who can enter the data exchange, the entities that may view a particular listing, the actions that an entity may take with respect to a listing (e.g., view only), and any other suitable action. In addition, a data provider may combine its own data with other data sets from, e.g., a public data exchange (also referred to as a "data marketplace"), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. The consumer accounts with which the database and its objects are shared may be indicated by a list of references to those consumer accounts contained within the share object. Only those consumer accounts that are specifically listed in the share object may be allowed to look up, access, and/or import from this share object. By modifying the list of references of other consumer accounts, the share object can be made accessible to more accounts or be restricted to fewer accounts.

Data exchanges typically contain a large number of available data listings. To assist users in navigating the data exchange, and to allow them to find listings that are relevant to them, the data exchange often provides a data listing search and rank capability. The search and rank capability may include a retrieval phase, and a ranking phase. During the retrieval phase, the data exchange may retrieve listings relevant to the user's search/query and ensure that only relevant listings are presented. During the ranking phase, the data exchange may determine the order (priority) in which the retrieved listings are presented to the user (e.g., via a UI or a programmatic interface).

Retrieved listings are often ordered based on either popularity, the date of the listing's addition (i.e., "most recent"), alphabetically based on the data listing titles, or a weighted version of the term frequency-inverse document frequency (TF-IDF) (each of these being a distinct option). The TF-IDF is a numerical statistic that is intended to reflect how important a word is to a document in a collection or corpus, and a TF-IDF analysis may result in a score for individual words in a data listing based on how important that word is. However, the above approaches are limited in the factors they can account for (such as user-specific factors or variations in language between a data listing and a search query) and thus can often provide a sub-optimal ranking of the retrieved listings.

Embodiments of the present disclosure address the above noted and other problems by providing techniques for ranking retrieved data listings based on a large language model (LLM). In some embodiments, a collection of data listings of a data exchange may be processed through an LLM to generate embeddings for each of the listings. The embeddings may represent a vector that describes the data listing within a logical space (e.g., a semantic and/or syntactic space). A search engine of the data exchange may receive (from a user) a search query comprising a set of search terms, and retrieve a set of data listings based on the search terms of the search query. The search query may also be processed by the LLM to generate an embedding for the search query. A data ranking module of the search engine may analyze the embeddings for the data listings returned by the search query as well as the embedding for the search query to determine which of the data listings are most relevant to the search query, and the data listings may be ranked based on the determined relevance to the search query.

In some embodiments, a generative model of the LLM may also be used to generate an explanation of the relevance of the returned data listings to the search query. For example, the data listing (including a description of the data listing) may be provided to the generative module of the LLM to generate an explanation that relates the search query to each one of the returned data listings. The explanation may be provided to the user along with the search listing results.

FIG. 1A is a block diagram of an example computing environment 100 in which the systems and methods disclosed herein may be implemented. In particular, a cloud computing platform 110 may be implemented, such as Amazon Web Services™ (AWS), Microsoft Azure™, Google Cloud™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g. SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as Amazon S3™ to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126.

Figure 1B:
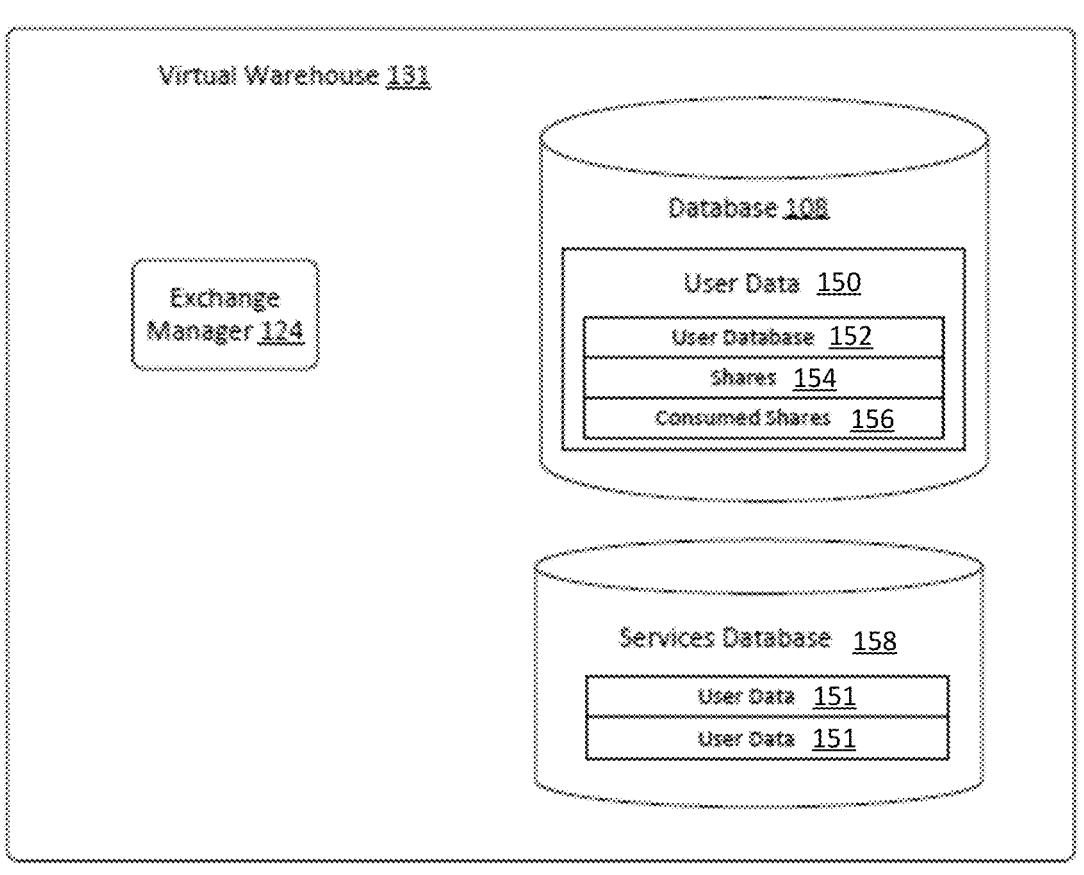
FIG. 1B is a block diagram illustrating an example virtual warehouse, in accordance with some embodiments of the present disclosure.

FIG. 1B is a block diagram illustrating an example virtual warehouse 131. The exchange manager 124 may facilitate the sharing of data between data providers and data consumers, using, for example, a data exchange. For example, cloud computing service 112 may manage the storage and access of a database 108. The database 108 may include various instances of user data 150 for different users, e.g., different enterprises or individuals. The user data 150 may include a user database 152 of data stored and accessed by that user. The user database 152 may be subject to access controls such that only the owner of the data is allowed to change and access the user database 152 upon authenticating with the cloud computing service 112. For example, data may be encrypted such that it can only be decrypted using decryption information possessed by the owner of the data.

Using the exchange manager 124, specific data from a user database 152 that is subject to these access controls may be shared with other users in a controlled manner according to the methods disclosed herein. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of cloud computing service 112.

Sharing data may be performed when a data provider creates a share of a database in the data provider's account and grants access to particular objects (e.g., tables, secure views, and secure user-defined functions (UDFs)). Then a read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share). A secure join may be performed as described in U.S. application Ser. No. 16/368,339, filed Mar. 28, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations (joining, aggregating, analysis, etc.) ascribed to a user (consumer or provider) shall be understood to include performing of such actions by the cloud computing service 112 in response to an instruction from that user.

Figure 2:
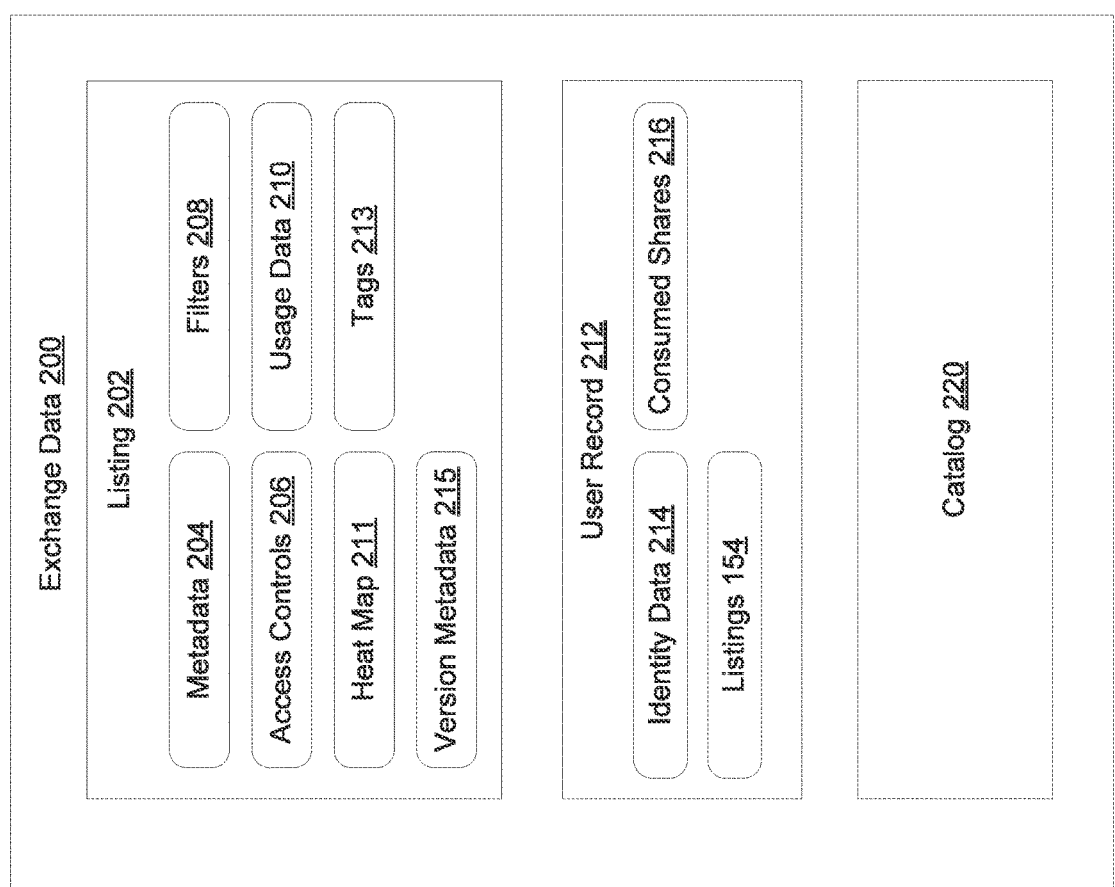
FIG. 2 is a schematic block diagram of data that may be used to implement a public or private data exchange, in accordance with some embodiments of the present disclosure.

FIG. 2 is a schematic block diagram of data that may be used to implement a public or data exchange in accordance with an embodiment of the present disclosure. The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider"). The listings 202 may be listings in a data exchange or in a data marketplace. The access controls, management, and governance of the listings may be similar for both a data marketplace and a data exchange.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share in which users may request access but are only allowed access upon approval of the provider. The access controls 206 may specify a set of user identifiers of users that are excluded from being able to access the data referenced by the listing 202.

Note that some listings 202 may be discoverable by users without further authentication or access permissions whereas actual accesses are only permitted after a subsequent authentication step. The access controls 206 may specify that a listing 202 is only discoverable by specific users or classes of users.

Note also that a default function for listings 202 is that the data referenced by the share is not exportable by the consumer. Alternatively, the access controls 206 may specify that this is not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific identity data 214 (also referred to herein as user identifiers) of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202, i.e. adding the listing 202 to the consumed shares 156 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 156 of the user is permitted to access the data referenced by the listing but only a filtered version that only includes data associated with the identifier 214 of that user, associated with that user's organization, or specific to some other classification of the user. In some embodiments, a private exchange is by invitation: users invited by a provider to view listings 202 of a private exchange are enabled to do by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange manager 124 to the consumed shares 156 of the user.

The listing 202 may also include a heat map 211, which may represent the geographical locations in which users have clicked on that particular listing. The cloud computing service 112 may use the heat map to make replication decisions or other decisions with the listing. For example, a data exchange may display a listing that contains weather data for Georgia, USA. The heat map 211 may indicate that many users in California are selecting the listing to learn more about the weather in Georgia. In view of this information, the cloud computing service 112 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 112 may replicate that data and store it in servers located in the eastern United States, so that consumers in the Midwest and on the East Coast may also have access to that data.

The listing 202 may also include one or more tags 213. The tags 213 may facilitate simpler sharing of data contained in one or more listings. As an example, a large company may have a human resources (HR) listing containing HR data for its internal employees on a data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 202 may also include version metadata 215. Version metadata 215 may provide a way to track how the datasets are changed. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 215. The cloud computing service 112 may ensure that each data consumer accesses the same version of the data until they accept an updated version that will not interfere with current processing of the data set.

The exchange data 200 may further include user records 212. The user record 212 may include data identifying the user associated with the user record 212, e.g. an identifier (e.g., warehouse identifier) of a user having user data 151 in service database 158 and managed by the virtual warehouse 131.

The user record 212 may list shares associated with the user, e.g., reference listings 154 created by the user. The user record 212 may list shares consumed by the user, e.g. reference listings 202 created by another user and that have been associated to the account of the user according to the methods described herein. For example, a listing 202 may have an identifier that will be used to reference it in the shares or consumed shares 156 of a user record 212.

The listing 202 may also include metadata 204 describing the shared data. The metadata 204 may include some or all of the following information: an identifier of the provider of the shared data, a URL associated with the provider, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The metadata 204 may further include category information indicating a type of the data/service (e.g., location, weather), industry information indicating who uses the data/service (e.g., retail, life sciences), and use case information that indicates how the data/service is used (e.g., supply chain optimization, or risk analysis). For instance, retail consumers may use weather data for supply chain optimization. A use case may refer to a problem that a consumer is solving (i.e., an objective of the consumer) such as supply chain optimization. A use case may be specific to a particular industry, or can apply to multiple industries. Any given data listing (i.e., dataset) can help solve one or more use cases, and hence may be applicable to multiple use cases.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there are multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only specified one or more computing platforms 110.

In some embodiments, the catalog 220 is made available on the Internet such that it is searchable by a search engine such as the Bing™ search engine or the Google search engine. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable and can be shared outside of any interface implemented by the exchange manager 124. For example, the provider of a listing 202 may publish the URLs for its listings 202 in order to promote usage of its listing 202 and its brand.

Figure 3:
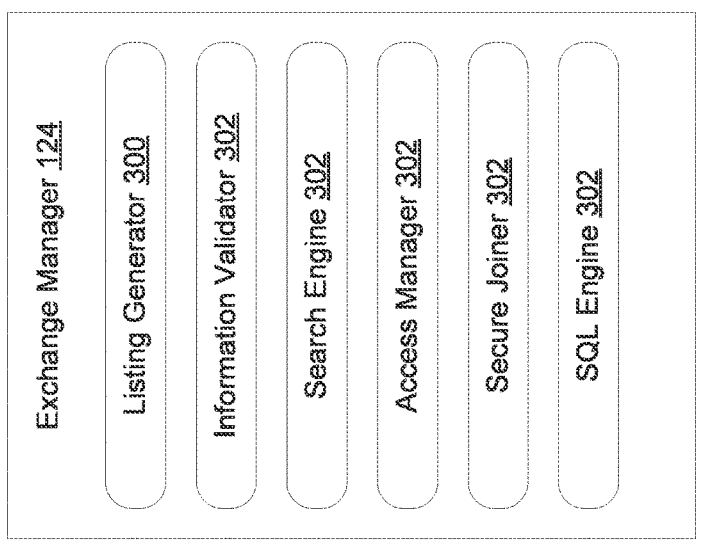
FIG. 3 is a block diagram of a data exchange manager, in accordance with some embodiments of the present disclosure.

FIG. 3 illustrates various components 300-310 that may be included in the exchange manager 124. One or more of the components 300-310 may be implemented as a software module (that is executed by a processing device), firmware that is included on a processing device, or in any other appropriate manner. A listing generator 300 may provide an interface for creating listings 202. For example, a webpage interface to the virtual warehouse 131 that enables a user on a device 101-104 to select data, e.g. a specific table in user data 150 of the user, for sharing and enter values defining some or all of the metadata 204, access controls 206, and filters 208. In some embodiments, creation may be performed by a user by way of SQL commands in an SQL interpreter executing on the cloud computing platform 110 and accessed by way of a webpage interface on a user device 101-104.

An information validator 302 may validate information provided by a provider when attempting to create a listing 202. Note that in some embodiments the actions ascribed to the information validator 302 may be performed by a human reviewing the information provided by the provider. In other embodiments, these actions are performed automatically. The information validator 302 may perform, or facilitate performing by a human operator of various functions. These functions may include verifying that the metadata 204 is consistent with the shared data to which it references, verifying that the shared data referenced by metadata 204 is not pirated data, personal identification information (PII), personal health information (PHI) or other data from which sharing is undesirable or illegal. The information validator 302 may also facilitate the verification that the data has been updated within a threshold period of time (e.g., within the last twenty-four hours). The information validator 302 may also facilitate verifying that the data is not static or not available from other static public sources. The information validator 302 may also facilitate verifying that the data is more than merely a sample (e.g., that the data is sufficiently complete to be useful). For example, geographically limited data may be undesirable whereas an aggregation of data that is not otherwise limited may still be of use.

The exchange manager 124 may include a search engine 304. The search engine 304 may implement a webpage interface that is accessible by a user on user devices 101-104 in order to invoke searches for search strings with respect to the metadata in the catalog 220, receive responses to searches, and select references to listings 202 in search results for adding to the consumed shares 156 of the user record 212 of the user performing the search. In some embodiments, searches may be performed by a user by way of SQL commands in an SQL interpreter executing on the cloud computing platform 110 and accessed by way of a webpage interface on user devices 101-104. For example, searching for shares may be performed by way of SQL queries against the catalog 220 within the SQL engine 310 discussed below.

The search engine 304 may further implement a recommendation algorithm. For example, the recommendation algorithm could recommend other listings 202 for a user based on other listings in the user's consumed shares 156 or formerly in the user's consumed shares. Recommendations could be based on logical similarity: one source of weather data leads to a recommendation for a second source of weather data. Recommendations could be based on dissimilarity: one listing is for data in one domain (geographic area, technical field, etc.) results in a listing for a different domain to facilitate complete coverage for the user's analysis (different geographic area, related technical field, etc.).

The exchange manager 124 may include an access manager 306. As described above, a user may add a listing 202. This may require authentication with respect to the provider of the listing 202. Once a listing 202 is added to the consumed shares 156 of the user record 212 of a user, the user may be either (a) required to authenticate each time the data referenced by the listing 202 is accessed or (b) be automatically authenticated and allowed to access the data once the listing 202 is added. The access manager 306 may manage automatic authentication for subsequent access of data in the consumed shares 156 of a user in order to provide seamless access of the shared data as if it was part of the user data 150 of that user. To that end, the access manager 306 may utilize the access controls 206 of the listing 202, certificates, tokens, or other authentication material in order to authenticate the user when performing accesses to shared data.

The exchange manager 124 may include a secure joiner 308. The secure joiner 308 manages the integration of shared data referenced by consumed shares 156 of a user with one another, i.e., shared data from different providers, and with a user database 152 of data owned by the user. In particular, the secure joiner 308 may manage the execution of queries and other computation functions with respect to these various sources of data such that their access is transparent to the user. The secure joiner 308 may further manage the access of data to enforce restrictions on shared data, e.g., such that analysis may be performed and the results of the analysis displayed without exposing the underlying data to the consumer of the data where this restriction is indicated by the access controls 206 of a listing 202.

The exchange manager 124 may further include a standard query language (SQL) engine 310 that is programmed to receive queries from a user and execute the query with respect to data referenced by the query, which may include consumed shares 156 of the user and the user data 150 owned by the user. The SQL engine 310 may perform any query processing functionality known in the art. The SQL engine 310 may additionally or alternatively include any other database management tool or data analysis tool known in the art. The SQL engine 310 may define a webpage interface executing on the cloud computing platform 110 through which SQL queries are input and responses to SQL queries are presented.

Figure 4A:
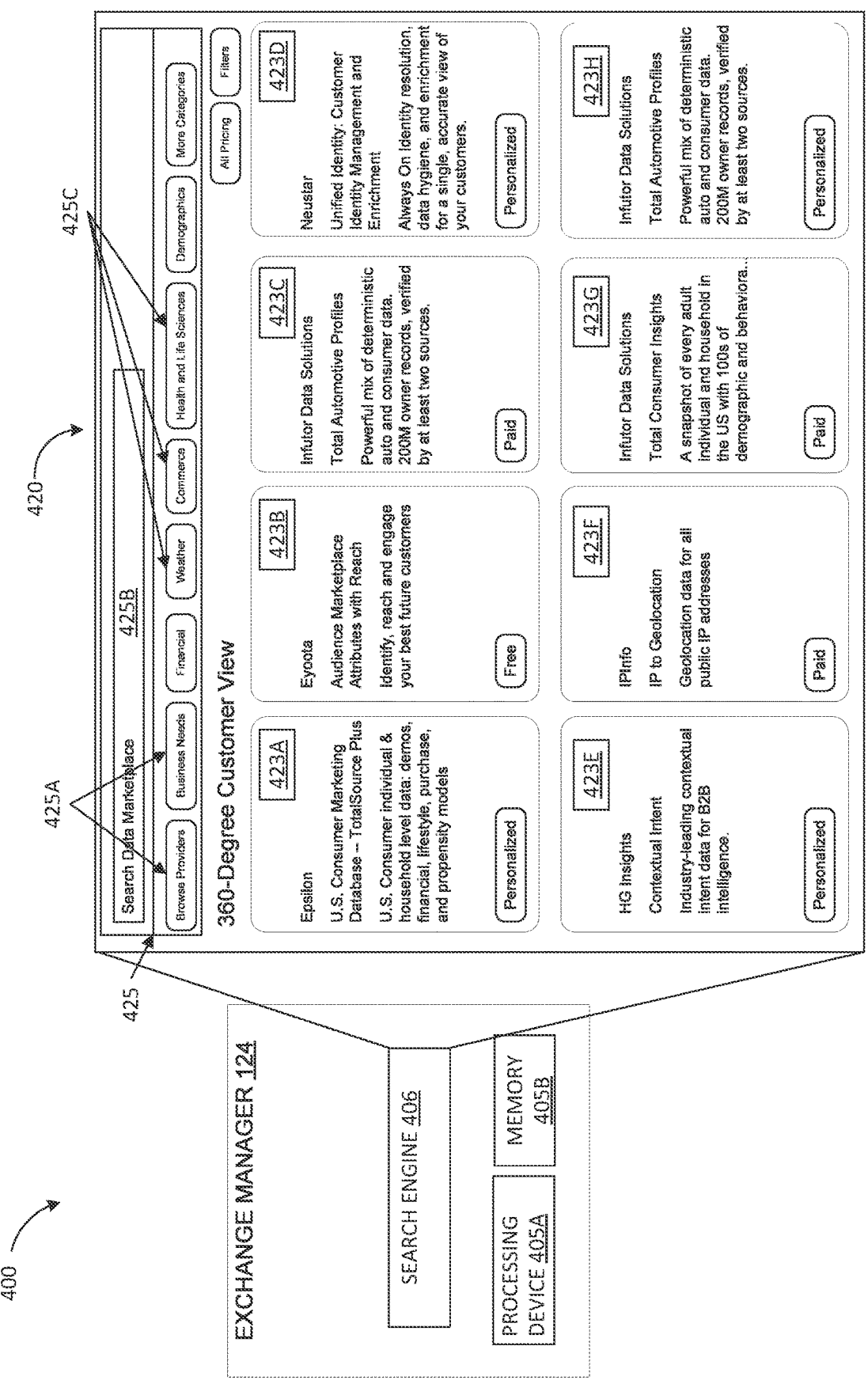
FIG. 4A is a schematic block diagram of deployment of a data exchange where data listing search and ranking techniques are performed, in accordance with some embodiments of the present disclosure.

FIG. 4A is a schematic block diagram of deployment of a data exchange where data listing search and ranking techniques are performed, in accordance with some embodiments of the present disclosure. FIG. 4A illustrates a cloud environment 400 comprising an exchange manager 124, which may comprise a similar architecture to cloud computing service 112 (illustrated in FIG. 1A) and may be a deployment of a data exchange or data marketplace. Although illustrated with a single cloud deployment, the cloud environment 400 may have multiple cloud deployments which may be physically located in separate remote geographical regions but may all be deployments of a single data exchange or data marketplace. Although embodiments of the present disclosure are described with respect to a data exchange, this is for example purpose only and the embodiments of the present disclosure may be implemented in any appropriate enterprise database system or data sharing platform where data may be shared among users of the system/platform.

As discussed herein, data that is to be shared via the share object may be represented on the data exchange by a listing as discussed herein with respect to FIG. 2. The exchange manager 124 may include a search engine 406 which may provide logic and an interface for searching for data listings. In some embodiments, the search engine 406 may be similar to the search engine 304 described herein with respect to FIG. 3. FIG. 4A illustrates a data listing interface 420 via which the user may navigate the data exchange and search for/add listings. The interface 420 may be provided by the data exchange when the user logs into the data exchange via e.g., a web browser. As discussed herein, the data exchange may include a plurality of published data listings 423A-423H, and the data listing interface 420 may include interactable representations of each of the published data listings (hereinafter referred to as data listings 423) as well as a listing search and filter feature 425. The listing search and filter feature 425 may include a number of different tools for searching for/filtering through the published data listings 423A-423H including provider drop-down menus 425A (to search for/filter data listings 423 by provider), a keyword search bar 425B (to search for/filter data listings 423 by keyword) and category filters 425C (to search for/filter data listings 423 by category).

Figure 4B:
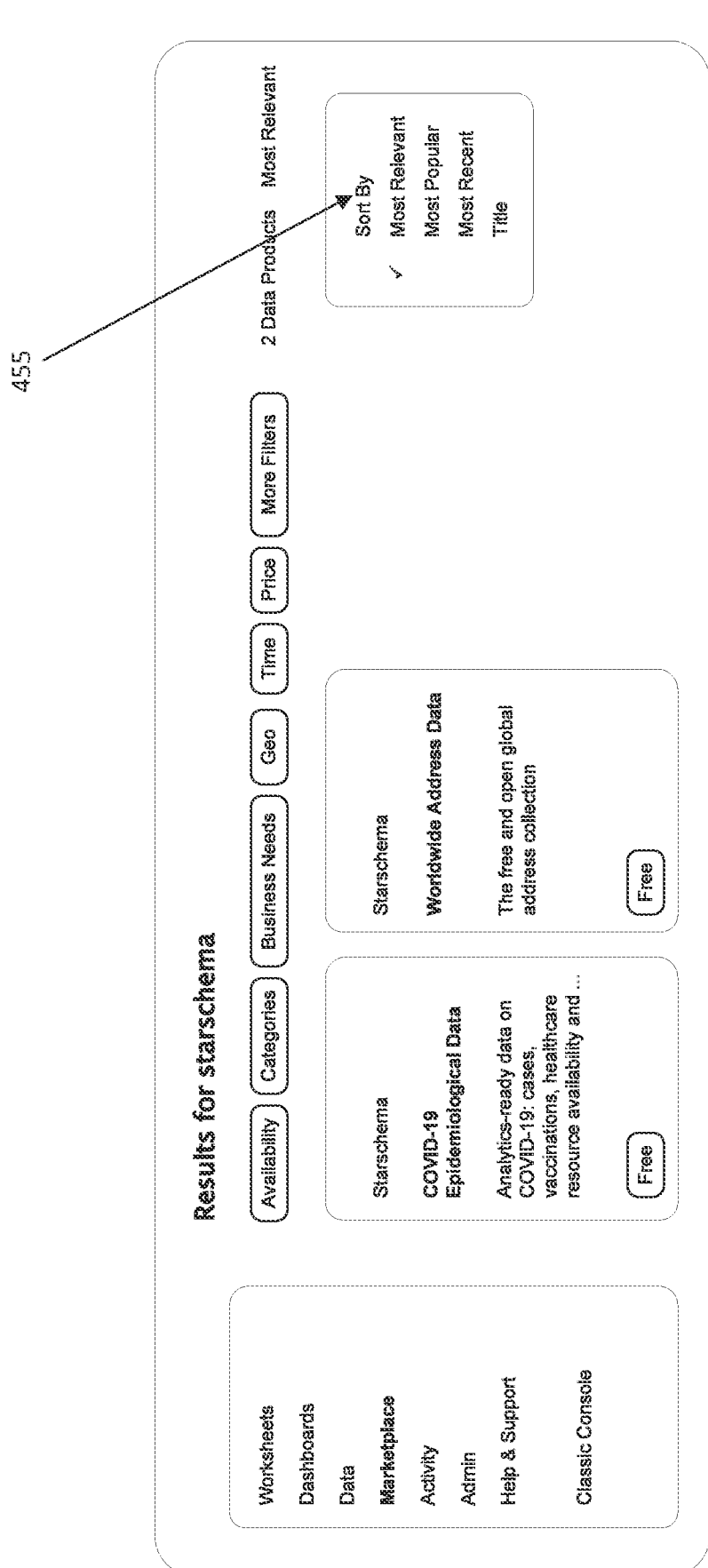
FIG. 4B illustrates an interface providing a search and ranking function for data listings, in accordance with some embodiments of the present disclosure.

As discussed hereinabove, during the retrieval phase the data exchange may retrieve listings relevant to the user's search/query and ensure that only relevant listings are presented. During the ranking phase, the data exchange may determine the order (priority) in which the retrieved listings are presented to the user (e.g., via a UI or a programmatic interface). Search results are often ranked based on either popularity, the date of the listing's addition (i.e., "most recent"), alphabetically based on the data listing titles, or a weighted version of the term frequency-inverse document frequency (TF-IDF) (each of these being a distinct option). The TF-IDF is a numerical statistic that is intended to reflect how important a word is to a document in a collection or corpus, and a TF-IDF analysis may result in a score for individual words in a data listing based on how important that word is. FIG. 4B illustrates a search interface 450 which may be similar to the data listing interface 420 but may include a sort by drop down menu 455 which includes a number of options that the user can select to rank their retrieved data listings.

However, the above approaches are limited in the factors they can account for (such as user-specific factors) and thus can often provide a sub-optimal ranking of the retrieved listings. Thus, embodiments of the present disclosure may provide techniques for ranking retrieved data listings based on what is relevant to both the query and the user by utilizing an LLM to determine embeddings for the search terms provided in the search interface 450 and compare those embeddings to embeddings associated with the data listings 423, as discussed in further detail herein. The drop-down menu 455 of FIG. 4B further includes a "Relevance" sort option, selection of which may result in a sorting of retrieved data listings in accordance with some embodiments of the present disclosure.

FIG. 5 is a schematic diagram illustrating additional details of the cloud environment 400 comprising the exchange manager 124 of FIG. 4A, where data listing search and ranking techniques are performed utilizing an LLM 510, in accordance with some embodiments of the present disclosure. A description of elements of FIG. 5 that have been previously described will be omitted for brevity.

The exchange manager 124 may be a computing device, and may include hardware such as processing device 405A (e.g., processors, central processing units (CPUs)), memory 405B (e.g., random access memory (e.g., RAM), storage devices (e.g., hard-disk drive (HDD), solid-state drive (SSD), etc.), and other hardware devices (e.g., sound card, video card, etc.).

Processing device 405A may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 405A may also include one or more special-purpose processing devices such as a microcontroller, an application specific integrated circuit (ASIC), a field programmable gate array (FPGA), a digital signal processor (DSP), network processor, or the like.

Memory 405B may include volatile memory devices (e.g., random access memory (RAM)), non-volatile memory devices (e.g., flash memory) and/or other types of memory devices. As a non-limiting example, the non-volatile memory may include a read-only memory (ROM), a programmable read-only memory (PROM), an erasable programmable read-only memory (EPROM), an electrically erasable programmable read-only memory (EEPROM), or a flash memory. In certain implementations, memory 405B may be non-uniform access (NUMA), such that memory access time depends on the memory location relative to processing device 405A. In some embodiments, memory 405B may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 405B may be configured for long-term storage of data and may retain data between power on/off cycles.

Referring to FIG. 5, the exchange manager 124 may include an LLM 510. The LLM 510 may be trained on vast amounts of text data using unsupervised learning techniques. During the training process, the LLM 510 may learn to predict the next word in a sentence based on the context provided by the preceding words. This process enables the LLM 510 to develop a rich understanding of the relationships between words and the contextual nuances of language. An example of an LLM 510 includes GPT-3.

In some embodiments, text utilized to train the LLM 510 may include text available online, such as text on web pages, postings, and the like, but the embodiments of the present disclosure are not limited to such a configuration. In some embodiments, the LLM 510 may be trained on database-specific contents, such as those included in cloud environment 400. The LLM 510 may maintain its training state, for example, in LLM store 518, which can be utilized when the LLM 510 is operated.

Once the LLM 510 is trained, it may include an embedding engine 512 and a generative engine 514. The embedding engine 512 may be utilized to generate embeddings for words, sentences, or documents. Embedding may refer to the process of taking any data element, such as a text-string, an image, an audio snippet, and producing a vector of numbers for it. In other words, the original data element is "embedded" into the new multi-dimensional (embedding) space. The LLM 510 may contain a learned embedding component illustrated as embedding engine 512. Thus, the LLM 510 may be used to also get an embedding vector (also referred to herein as an "embedding"). The generated vectors are not random/arbitrary but, instead, the points associated with an embedding represented in the multi-dimensional space are close if the entities are similar and/or related.

These embeddings for a given input are numerical representations that encode semantic and syntactic properties of the language represented by the input. The embeddings may be high-dimensional vectors, where the dimensions capture different aspects of the language. The embeddings produced by the embedding engine 512 of the LLM 510 may have several desirable properties. First, the embeddings may capture semantic similarity, meaning that similar words or phrases are represented by vectors that are close to each other in the embedding space. For example, the embeddings of "dog" and "cat" would be closer together than the embeddings of "dog" and "car." This property allows for tasks like word similarity measurement or finding related words based on the vectors of the embedding.

Second, the embeddings may capture contextual information. Since the LLM 510 is trained on vast amounts of text, it may programmatically learn to understand the meaning of words based on their surrounding context. This enables the embeddings to reflect the meaning of a word within a specific sentence or document. Furthermore, the LLM 510 may generate sentence or document embeddings by aggregating the embeddings of individual words. This allows for understanding the overall meaning and semantic compositionality of longer text units.

As will be described further herein, the LLM 510 may generate an embedding for each of the data listings 423 (e.g., data listing 423A to 423G) and store the results in an embedding store 516. The embedding store 516 may include embeddings (e.g., multi-dimensional vectors) that describe and/or characterize each of the data listings 423.

The LLM 510 may also include a generative engine 514. The generative engine 514 portion of the LLM 510 may be capable of generating coherent and contextually relevant text based on the LLM store 518 generated as part of the training of the LLM 510.

In some embodiments, the generative engine 514 may employ a transformer architecture that enables it to capture complex language patterns and generate highly realistic and human-like text. As part of generating text, the generative engine 514 may operate by taking an initial prompt or seed text and then producing a continuation based on the learned language patterns represented by the model (e.g., stored in the LLM store 518). The generative engine 514 considers the context provided by the seed text and generates a sequence of words that are coherent and contextually appropriate. The generated text can be as short as a single word or as long as multiple paragraphs. As will be described further herein, the generative engine 514 may be utilized to improve the embeddings performed by the embedding engine 512 and/or provide an explanation for the recommendations provided by the data listing ranking engine 507.

Referring still to FIG. 5, the search engine 406 may receive a search query 502. For example, the search query 502 may be provided by the interface 420 as a result of input provided by a user to the keyword search bar 425B, as illustrated in FIG. 4A. The search engine 406 may provide the search query 502 to a data listing ranking engine 507 which may perform the search and filtering functions described herein. More specifically, the data listing ranking engine 507 may provide and order listings that are most relevant to the specific combination of a received search query 502 and the user during the ranking phase by performing search query embedding using a search query embedding engine 532 and by aggregating different input signals using a data signal engine 542, as described in further detail herein.

The search engine 406 may receive the search query 502 consisting of search terms, selections from one or more of the drop-down menus 425A and/or selection of one or more of the category filters 425C (see FIG. 4A). As an example, the search query 502 may include individual search terms such as "weather" and/or may include longer conversation-style questions such as "I want to find ad consumption and attribution data for Little Rock, Arkansas." In response, the search engine 406 may retrieve data listings 423 as it normally would during the search phase to obtain retrieved listings 423B-F as shown in FIG. 5, which may be a subset of all the data listings (e.g., 423A-423G) that are within the data exchange that match the search query 502. Once the listings 423B-F have been retrieved, the search engine 406 may transition to the ranking phase. During the ranking phase, the search engine 406 may execute the data listing ranking engine 507, which may provide the search query 502 to a search query embedding engine 532 and/or a data signal engine 542.

The search engine 406 may utilize the data listing ranking engine 507 to rank results in response to the search query 502. For example, the search query 502 may be parsed and processed (including normalization in some embodiments) and passed into the embedding engine 512 to generate an embedding (e.g., a multi-dimensional vector) corresponding to the search query 502. The embedding corresponding to the search query 502 may then be used to search for nearest neighbors to the embedding in the embedding store 516 from among the retrieved data listings 423, which may contain embeddings for each of the data listings 423 of the data exchange. In some embodiments, the data listings 423 corresponding to the nearest-neighbor embeddings may be passed to a next phase where, for each retrieved listing, information from the corresponding embedding is combined with other signals to compute the final aggregated sum score for each data listing 423 of the retrieved data listings 423. In some embodiments, result-listings are presented to the user in descending order of the total score. In some embodiments, a cutoff threshold may be utilized to omit data listings 423 whose scores indicate that they are not relevant enough to the search query 502.

In some embodiments, for the top k results (where k is a positive integer), the generative engine 514 of the LLM 510 may be invoked with a question of the form: "Why is this listing titled <listing_title>, by provider <provider_name>, with description <query_description>, . . . relevant for the query <original_user_query>?" The resulting generated answer from the generative engine 514 may be provided by the LLM 510 and included in the results provided to the user in response to the search query 502.

The use of the LLM 510 to process and/or rank search results from a search query 502 may provide a number of benefits as compared with some keyword-based approaches. In some embodiments, the use of an LLM 510 may provide for synonym & related-keyword search. As an example, a search query 502 may include the terms "Japan stock market." A correctly trained LLM 510 has the capability to distinguish the semantic relationship between Japan and APAC (Asia Pacific) and may also retrieve a data listing 423 related to APAC stock markets even if there is no explicit mention of Japan in the listing description. Similarly, a search query 502 for "restaurants" should yield "diner" related data, etc. This is in contrast to keyword-based approaches that may either be unable to infer this connection, or may utilize a separate mechanism for determining synonyms or other relevant words.

In some embodiments, the use of the LLM 510 provides the ability to interact in a "conversational" and/or free-text manner. This may include providing context to the question. As an example, if the LLM 510 is queried with "I want to spend a day at the beach, show me appropriate airfare data," the LLM 510 may determine that the user is looking for travel data-related listings 423 and may also capture the significance of the first part of the query (e.g., the beach) and promote more geographically appropriate data listings 423.

In some embodiments, the use of the LLM 510 may make the search experience become more interactive by asking follow-up questions of various types. In some embodiments, the generative engine 514 of the LLM 510 may be used to provide conversational-like output and/or reasoning about the data at several stages of the process. This may include explaining the data, explaining the relevance of results to the user, and/or dynamically providing the user with example SQL queries for the selected data listings 423.

Figure 6A:
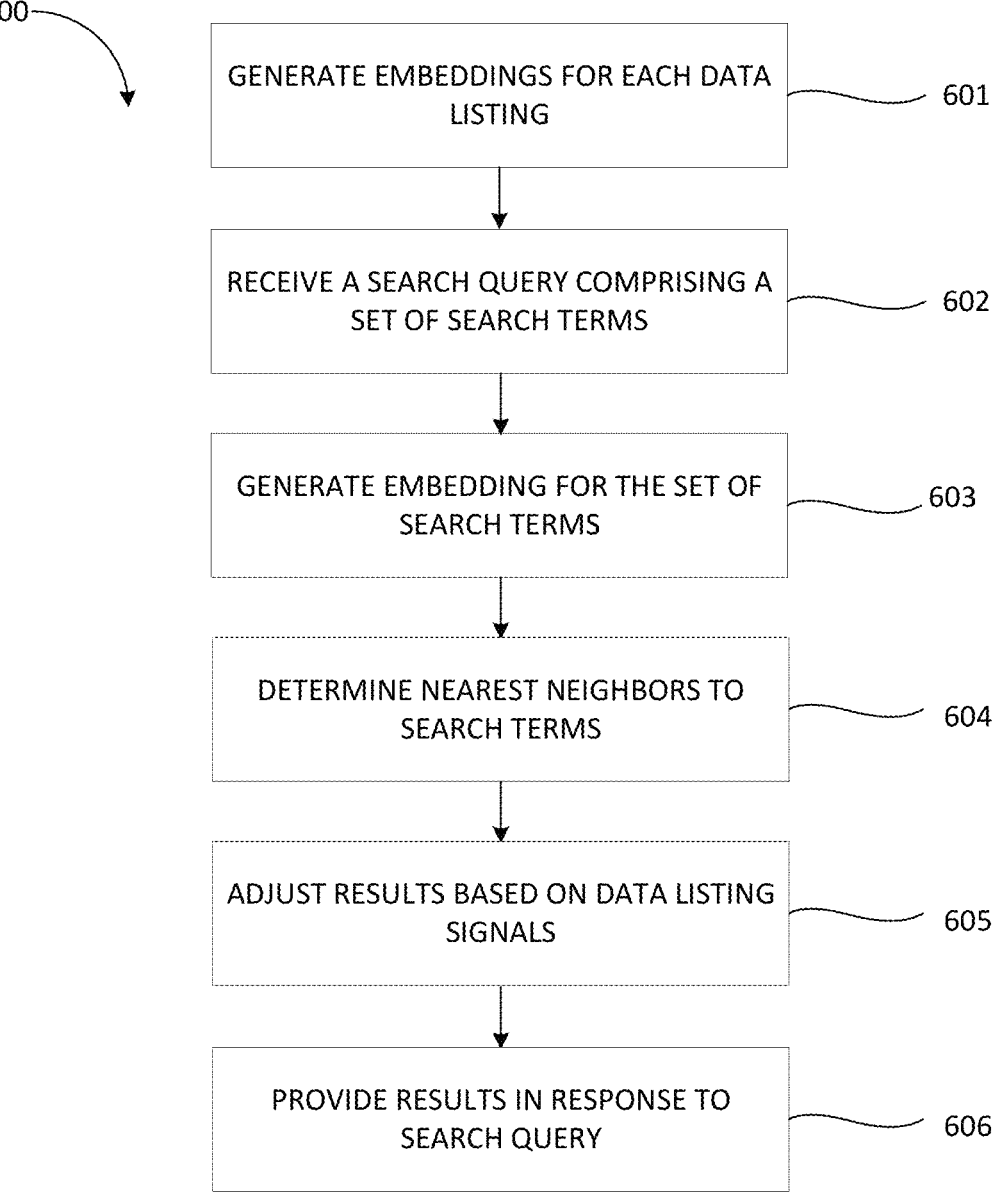
FIG. 6A is a flow diagram of a method of ranking search results, according to some embodiments of the present disclosure.

FIG. 6A is a flow diagram of a method 600 of ranking search results, according to some embodiments of the present disclosure. A description of elements of FIG. 6A that have been previously described will be omitted for brevity. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a computing device (e.g., exchange manager 124).

With reference to FIG. 6A, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Referring simultaneously to FIGS. 2, 3, 4A, 4B, and 5 as well, the method 600 begins at block 601, in which embeddings are generated for each data listing 423. As previously described, each of the embeddings may be a multi-dimensional vector that describes the data listing 423. For example, the contents of the data listing 423 and/or a description of the data listing 423 may be fed into the embedding engine 512 to generate the respective embeddings.

Figure 7A:
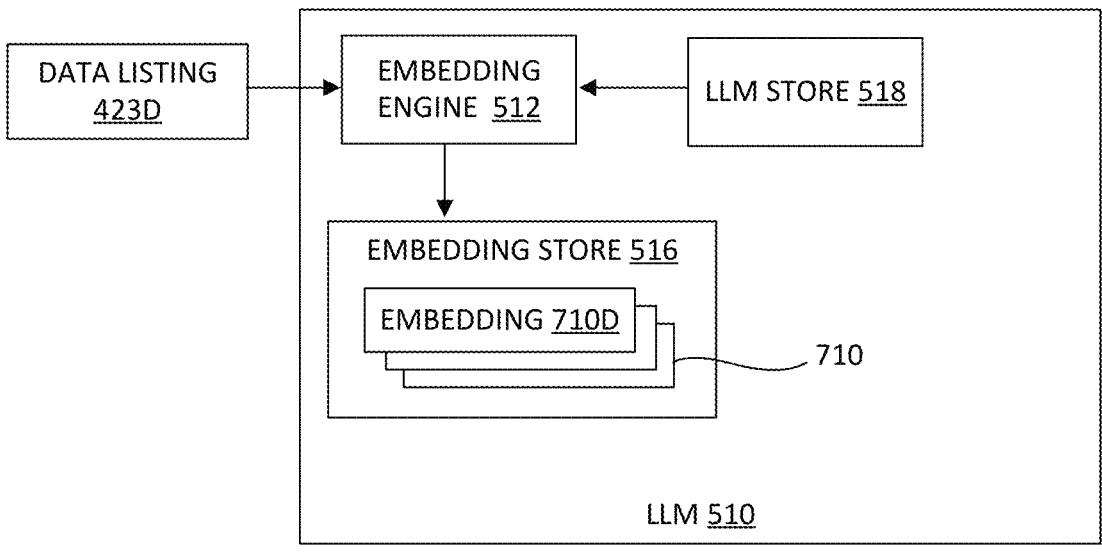
FIG. 7A is a schematic block diagram illustrating the generation of an embedding from a data listing utilizing an LLM, in accordance with some embodiments, of the present disclosure.

FIG. 7A is a schematic block diagram illustrating the generation of an embedding 710D from a data listing 423D utilizing an LLM 510, in accordance with some embodiments of the present disclosure. A description of elements of FIG. 7A that have been previously described will be omitted for brevity.

Referring to FIG. 7A, to generate an embedding 710D for a data listing 423D, the data listing 423D may be provided to the embedding engine 512. The embedding engine 512 may examine the data listing 423D, including the contents of the database referenced by the data listing 423D (including the database schema(s)) and/or metadata of the data listing 423D. The information may be processed by the LLM 510 (e.g., by a trained model which may be maintained in the LLM store 518) to generate the embedding 710D. In some embodiments, the generated embedding 710D may be stored in the embedding store 516, which may itself be a database. In some embodiments, the generated embedding 710D may be stored in the embedding store 516 together with an identifier (ID) that represents the original data listing 423D. In FIG. 7A, a sample data listing 423D is shown that generates a sample embedding 710D. However, it will be understood that this is for explanation purposes only, and that other embeddings 710 may be generated for other data listings 423.

In some embodiments, the generated embeddings 710 (which, as previously noted, may be a multi-dimensional vector) can correspond to data listings 423, to individual tables/schemas within each data listing 423, and/or to individual table-columns within each data listing 423. Thus, when searching the data listings 423 given an embedding 710 based on a search query 502, the nearest neighbors would correspond to the type of elements of the data listings 423 that are provided to the embedding engine 512. As a result, since the unit of transaction in the data marketplace may be a data listing 423 (and not necessarily individual tables/columns of a data listing 423), a merging & filtering step may be applied so that the user is not presented with multiple instances of the same data listing 423, if embeddings 710D correspond to entities "smaller" than (e.g., contained in) data listings 423. For example, if there are separate embeddings 710 generated for the metadata of a data listing 423 and the data (e.g., rows/columns and/or tables) of the data listing 423, they each may be associated with the data listing 423, so that information about the data listing 423 is returned if either the metadata or the table information matches an embedding associated with a search query 502. In some embodiments, a weighting strategy may be utilized in combining the similarity/distance scores of elements of the data listings 423 in order to appropriately rank, for example, a data listing 423 with one very relevant table and another data listing 423 with more tables that are each slightly less relevant.

In some embodiments, the various metadata associated with the data listing 423 may be combined into an input text that may be provided to the embedding engine 512. In some embodiments, database information specific to the data listing 423 may also be included, for example, information may be provided to the embedding engine 512 of representative database tables of the data listing 423, as well as columns that are included in the database table. For example, the embedding 710D may include the database table name and/or the fully qualifying string (e.g., "<database_name>.<schema_name>.<table_name>"). In some embodiments, a more verbose approach may be utilized to include more database table information, such as table names, column names, and/or sample data. As an example, a string may be constructed from a database table of the data listing 423 in a form similar to: "The table is named '<table_name>' and contains columns named: <column_1_name>, <column_2_name>, . . . . The first rows of the table are: <sample_row_data>. The table is part of a data listing named '<listing_name>', by provider '<provider_name>', and listing description: '<whole_l-isting_description.'" This example, although it produces an embedding 710D that corresponds to a single table of a data listing 423, may contain information for the data listing 423 and even the column names and sample data-rows. It will be understood that other types of data may be collected for the data listing 423 and provided to the embedding engine 512 without deviating from the scope of the present disclosure.

Similar needs for having a merging strategy going from table/column-scores to data listing scores for ranking may also apply to data input incorporating table data.

In some embodiments, the more text that is fed into the embedding process (technically more "tokens"), the slower it may become for the LLM 510 to produce the output embedding vector 710. Some LLMs have restrictions on input-token capacity/capability, so a trade-off may exist between the amount of data of the data listing 423 utilized for the generation of the embedding 710 and the granularity of the LLM 510.

Figure 7B:
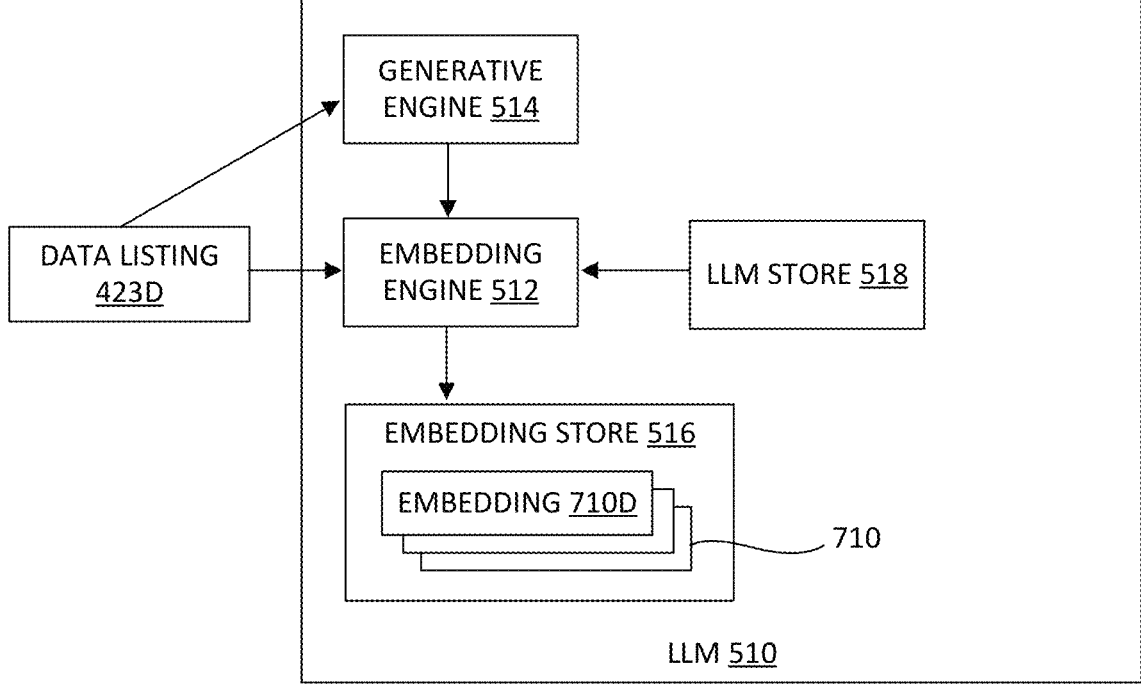
FIG. 7B is a schematic block diagram illustrating the generation of an embedding from a data listing utilizing a generative engine of an LLM, in accordance with some embodiments, of the present disclosure.

In some embodiments, the generative engine 514 may be utilized in tandem with the embedding engine 512 to generate the embedding 710D. FIG. 7B is a schematic block diagram illustrating the generation of an embedding 710D from a data listing 423D utilizing a generative engine 514 of an LLM 510, in accordance with some embodiments, of the present disclosure. A description of elements of FIG. 7B that have been previously described will be omitted for brevity.

An additional benefit provided by the use of the LLM 510 is that the generative engine 514 of the LLM 510 may be utilized to expand on the listing description, a table description, and/or a column description of the data listing 423 so that more information may be captured. As illustrated in FIG. 7B, the data listing 423D may be provided to both the embedding engine 512 and the generative engine 514.

For example, the data listing 423D may be provided to the generative engine 514 as input, and the generative engine 514 may be tasked with producing an expanded description based on the data listing 423D. The expanded description may then be combined with existing data that gets processed by the embedding engine 512 to produce the embedding 710D for the data listing 423D. For example, the generative engine 514 may be tasked to use its syntactic and/or semantic knowledge to examine the data listing 423D to automatically generate a description of the data listing 423D. As an example, the generative engine 514 may be provided with the prompt: "Describe the data represented by the tables available in data listing <name of data listing 423D>." Responsive to this prompt, the generative engine 514 may dynamically generate a description that may be used by the embedding engine 512 to generate the embedding 710D for the data listing 423D. In some embodiments, the description provided by the generative engine 514 may be utilized in addition to the description of the data listing 423D that is input to the embedding engine 512 as described herein with respect to FIG. 7A.

The use of the generative engine 514 may be useful in cases, for example, where a column name is not very informative on its own (maybe an acronym, or abbreviation, etc.). For example, a column name may be "emp_name" and the generative engine 514 may be able to determine, based on the context and/or syntax, that this column name refers to "employee name" and provide the synonym as part of the expanded description of the data listing 423. In some embodiments, the generative engine 514 may be able to provide additional context that can be deduced by the rest of the column-names. For example, if a column name is "number" but the table corresponds to athletes, it may be interpreted as a jersey number of the athlete. In contrast, if the table refers to residents, then the column may be interpreted as a phone number.

Referring back to FIG. 6A, once the embeddings 710 have been generated for each data listing 423, operations may proceed to block 602, in which a search query 502 is received. The search query 502 may include a set of search terms. As discussed herein with respect to FIG. 5, in some embodiments, the search query 502 may be a series of words (e.g., "weather") and, in some embodiments, may be a natural-language statement (e.g., "what will the weather be like in San Francisco next week?").

In block 603, an embedding may be generated for the set of search terms of the search query 502. As previously described, the embeddings may be a multi-dimensional vector that describes the search query 502. For example, the contents of search query 502 and/or individual terms of the search query 502 may be fed into the embedding engine 512 to generate the associated embedding.

Figure 8:
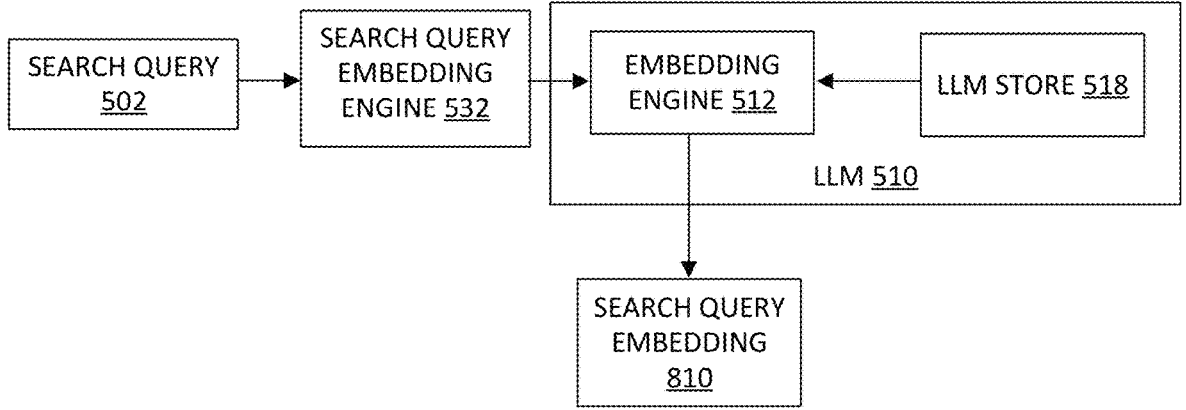
FIG. 8 is a schematic block diagram illustrating the generation of an embedding from a search query utilizing an LLM, in accordance with some embodiments, of the present disclosure.

FIG. 8 is a schematic block diagram illustrating the generation of an embedding 710D from a search query 502 utilizing an LLM 510, in accordance with some embodiments, of the present disclosure. A description of elements of FIG. 8 that have been previously described will be omitted for brevity.

Referring to FIG. 8, the search query 502 may be received by the search query embedding engine 532 (see FIG. 5). The search query embedding engine 532 may be configured to process the search query 502 to provide the search query 502 to the embedding engine 512 of the LLM 510. In some embodiments, the entire search query 502 may be provided to the embedding engine 512 to generate a search query embedding 810 utilizing the LLM store 518. In some embodiments, each search term of the search query 502 may be separately provided to the embedding engine 512 to generate a search query embedding 810 utilizing the LLM store 518. For example, the results of each of the search query embeddings 810 may be combined or otherwise correlated to generate the overall search query embedding 810 for the search query 502. As another example, the nearest-neighbor search results of each of the search query embeddings 810 may be combined or otherwise correlated to generate the overall search query embedding 810 for the search query 502.

In some embodiments, additional parsing may be performed on the search query 502. For example, in some cases, the search query 502 may include the names of a provider of a data listing 423. In some cases, absent additional processing, the LLM 510 may have difficulty determining context from a proper name, as some company names are in a foreign language, or a string of characters that have no meaning in any language. However, a provider name in the search query 502 may be extremely useful in providing relevant search results. Additional processing of the search query 502 may identify data of this type and augment the search process.

Referring back to FIG. 6A, once an embedding has been generated for the search terms of the search query 502, the method 600 may continue with block 604 in which nearest neighbors are detected from the LLM 510. For example, the search query embedding 810 (see FIG. 8) may be compared to the embeddings 710 (see FIGS. 7A and 7B) of the data listings 423 to determine which of the embeddings 710 associated with the retrieved data listings 423 are nearest to the search query embedding 810. As each of the embeddings 710/810 may be represented as vectors in a multi-dimensional space, nearness may be calculated based on the coordinates of the vectors. The set of nearest neighbors may be returned to the data listing and ranking engine 507. In some embodiments, the output of the LLM 510 may be the actual distance/similarity values of the search query embedding 810 and the data listing embeddings 710. In some embodiments, the output of the LLM 510 may be the ordinal ranking of the data listing embeddings 710.

In block 605, the results (e.g., the nearest neighbors) may be adjusted based on data listing signals. In some embodiments, the adjustment may be performed by the data signal engine 542. In some cases, the LLM 510 may operate on text tokens and may not be, by nature, designed to perform complex mathematical or other tasks such as ranking. Furthermore, the LLM 510 may not contain external information that may be important in providing users with high-quality recommendations. For example, just because a description of a data listing 423 is very similar to a search query 502, that does not necessarily imply that the data listing 423 is of high-quality and should be the one most recommended. In addition, as previously discussed, listing-provider names may cause difficulties since often they do not represent valid linguistic terms (e.g., they may include seemingly random letters). Thus, the output scores of the LLM 510 may not always be sufficient for getting a high-quality ranking. As a result, the nearest-neighbor results from the LLM 510 from block 604 may be combined with data listing signals. The data listing signals may include characteristics of the data listing 423, characteristics of the data and/or structure of the data listing 423, known details about the user providing the search query 502, characteristics of interactions with the data listing 423, and the like. In some embodiments, the use of data listing signals may be useful for applying various business objectives such as promoting or demoting data listings 423 of a specific type of provider, depending on the marketplace-operator's business goals.

Examples of data listings signals include listing-specific values such as global popularity, or information attempting to codify a notion of quality, such as number of rows, number of distinct values, rate of updates (hourly/daily/monthly/etc.) of the data listing 423. Other data listing signals may concern the pair combination of the user providing the search query 502 and the data listing 423 such as whether the geographic location of the user matches the language of the data of the data listing 423 or the region referred to by the data of the data listing 423. For example, if a Japan-based user searches for "stock market," a listing corresponding to data about the Japanese stock markets may be ranked higher. External signals that may be utilized to augment the search of data listings 423 are more fully described in U.S. application Ser. No. 18/085,452, filed Dec.

20, 2022, and entitled "IMPROVED SEARCH IN A DATA MARKETPLACE," the disclosure of which is fully incorporated herein by reference.

Based on the data listing signals, the ranking order of the results returned by the LLM 510 may be adjusted. For example, some data listings 423 that are listed as highly relevant by the LLM 510 may be adjusted downwards based on the data listing signals. As another example, some data listings 423 that are listed as less relevant by the LLM 510 may be adjusted upwards based on the data listing signals.

In some embodiments, the output of the LLM 510 can be one of the many data listing signals that are used for computing the final score for each data listing 423 that is used to determine the ranking order. In some embodiments, each signal-value may be normalized (limited to values between 0 and 1) and multiplied with a signal-vector. In some embodiments, signals that are deemed more important (e.g., a provider name within the search query 502) may be given higher weight-values. In some embodiments, the weights for the different signal values may be determined by a machine learning process.

In block 606, the results, as adjusted by the data listing signals, may be provided in response to the search query 502. In some embodiments, the results may be transmitted to the user who provided the search query 502. In some embodiments, the ranking results may be provided as part of user interface that is generated, which may be displayed to the user who provided the search query 502. Examples of possible user interfaces will be described further herein.

Figure 6B:
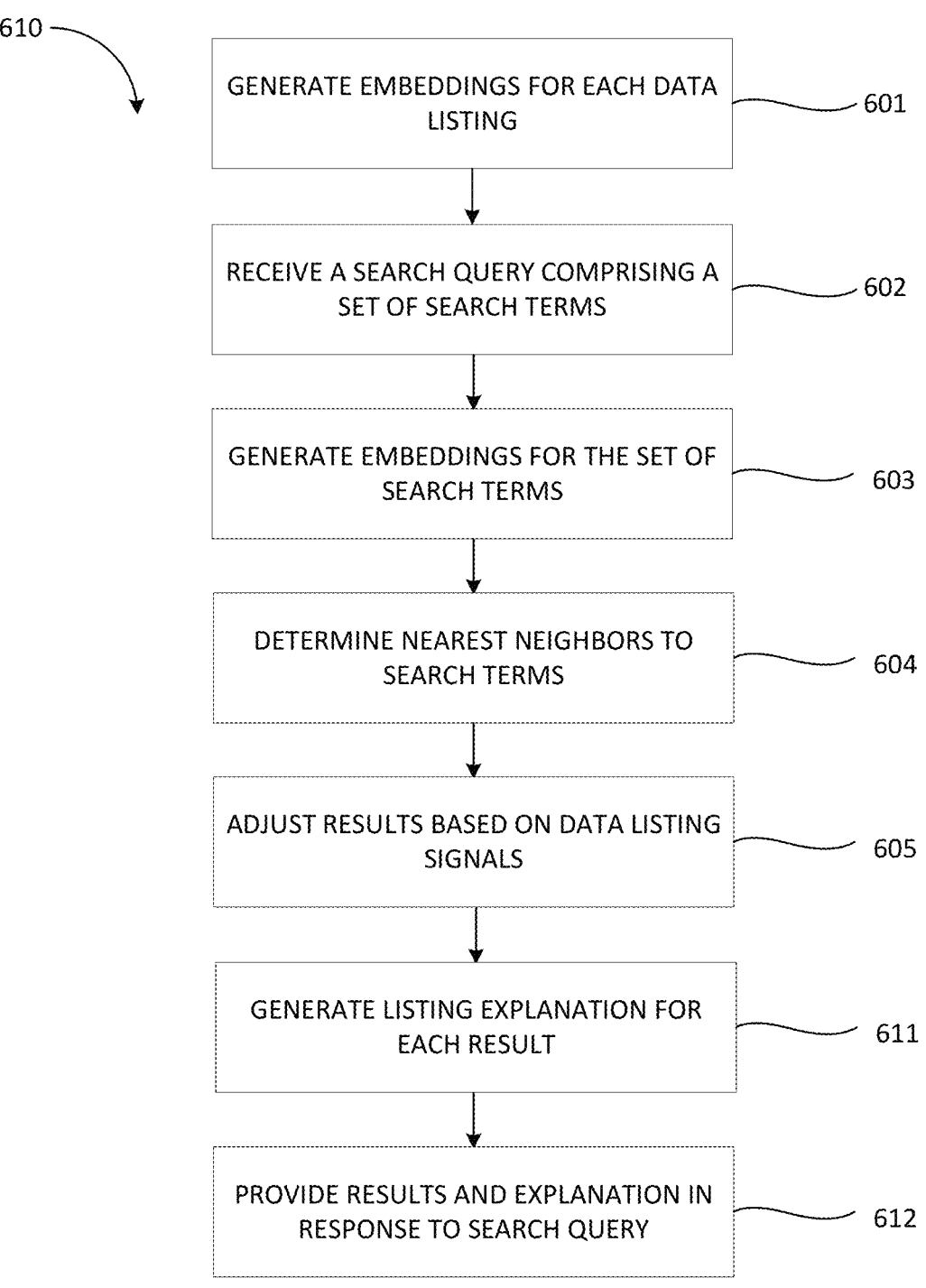
FIG. 6B is a flow diagram of an additional method of ranking search results, according to some embodiments of the present disclosure.

FIG. 6B is a flow diagram of an additional method 610 of ranking search results, according to some embodiments of the present disclosure. A description of elements of FIG. 6B that have been previously described will be omitted for brevity. Method 610 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 610 may be performed by a computing device (e.g., exchange manager 124).

With reference to FIG. 6B, method 610 illustrates example functions used by various embodiments. Although specific function blocks ("blocks") are disclosed in method 610, such blocks are examples. That is, embodiments are well suited to performing various other blocks or variations of the blocks recited in method 610. It is appreciated that the blocks in method 610 may be performed in an order different than presented, and that not all of the blocks in method 610 may be performed.

Blocks 601 through 605 of method 610 are the same or similar to those described herein with respect to 6A and, as a result, a description thereof will be omitted. Referring simultaneously to FIGS. 2, 3, 4A, 4B, 5, and 6A as well, the method 610 may continue to block 611 after adjusting the results from the LLM 510 based on the data listing signals. In block 611, an explanation may be generated for each of the results.

Figure 9:
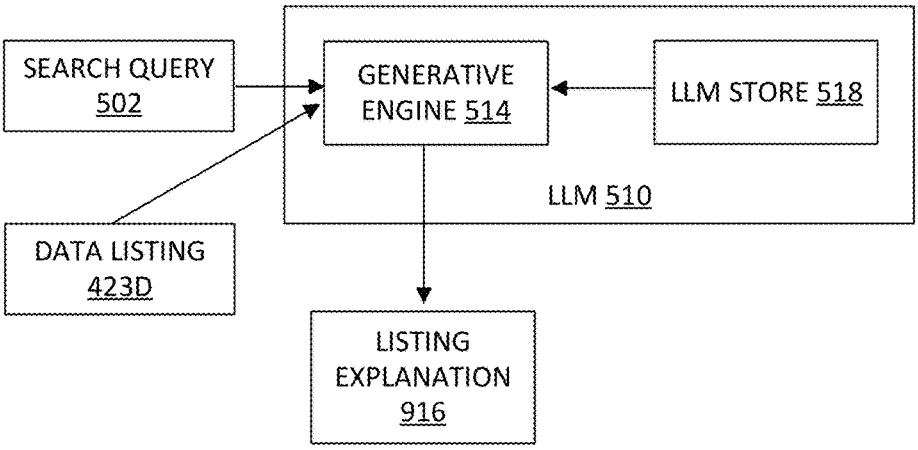
FIG. 9 is a schematic block diagram illustrating the generation of a listing explanation from a data listing and a search query utilizing an LLM, in accordance with some embodiments of the present disclosure.

Generating the listing explanation may consist of utilizing the generative engine 514. FIG. 9 is a schematic block diagram illustrating the generation of a listing explanation 916 from a data listing 423D and a search query 502 utilizing an LLM 510, in accordance with some embodiments of the present disclosure. A description of elements of FIG. 9 that have been previously described will be omitted for brevity.

Referring to FIG. 9, the generative engine 514 may be provided, for each data listing 423 within the set of the results, with both the search query 502, the data listing 423D, and/or information related to the data listing 423D. This information may be provided to the generative engine 514 with a prompt to generate a relevance between the provided search query 502, the data listing 423, and/or information related to the data listing 423D. Utilizing the LLM store 518, the generative engine 514 may generate the listing explanation 916 based on perceived syntactical and/or semantic similarities between the search query 502 and the data listing 423D.

As illustrated in FIG. 9, the top data listings 423 of results may be examined and, for each one, the LLM 510 may be prompted to generate the listing explanation 916 explaining why the listing is relevant to the user's search query 502. In some embodiments, the data provided as input to the generative engine 514 may be very similar to the data used when creating the embeddings 710 described herein with respect to FIGS. 7A and 7B. Asking the LLM 510, for example, "why is a listing titled <listing_title> relevant to the query <query_string>" may not yield valid information if the LLM 510 used a lot more data, such as the listing description, table names etc., in the embedding phase, but used different information when generating the explanation of relevance of the listing explanation 916. The use of the listing explanation 916 may enable the user to make better decisions in adopting or discarding the data listings 423 of the results.

FIG. 10A is an example query 1010 that may be provided to the generative engine 514 to generate the listing explanation 916 of FIG. 9, in accordance with some embodiments of the present disclosure. FIG. 10B is an example response 1020 that may be provided by the generative engine 514 in response to the query 1010 of FIG. 10A. The query/response illustrated in FIGS. 10A and 10B are merely examples, and are not intended to limit the embodiments of the present disclosure.

As illustrated in FIG. 10A, the query 1010 provided to the generative engine 514 may be of the form "Why is the following listing titled <listing title> by provider <provider> relevant to the search query <search query>; listing description <listing description>." As illustrated in FIG. 10B, the generative engine 514 may automatically (e.g., through the use of the LLM 510) respond with a response 1020. In the example of FIG. 10B, the response 1020 is of the form "This listing is relevant to the search query <search query> for a few reasons: <list of reasons>." The reasons provided in the response 1020 are generated by the generative engine 514 through the use of the LLM 510. In some embodiments, the contents of the response 1020 may be provided as part of the listing explanation 916.

Referring back to FIG. 9, one benefit of the use of the listing explanation 916 is the ability to answer the user's inherent question of "how is this relevant to what I do?" and/or "why is this useful to me?" Another example prompt to the generative engine 514 to generate the listing explanation may be "A user in the Consumer Packaged Goods industry has database schemas and tables with the following names: <schema1.table1> . . . . Explain why the following listing titled <listing_title> can be useful for the user. Listing description: <listing_description>." If the LLM is trained to know specifically about that listing, the prompt could avoid including the last part ("Listing description: <listing_description>"). Otherwise, it's appropriate to provide the description, which is part of the context for the question, and rely on the LLM for its reasoning power.

In some embodiments, the listing explanation 916 may further include examples of how the data listing 423 could be used. For example, the generative engine 514 of the LLM 510 may be utilized to answer the question "how can I use this dataset in combination with my existing data?" for the user. In some embodiments, a query may be generated to the generative engine 514 that instructs the LLM 510 to produce one or more example SQL queries combining the user's existing tables and the tables in the data listing 423.

FIG. 11A is an example query 1110 that may be provided to the generative engine 514 to generate a usage example for inclusion in the listing explanation 916 of FIG. 9, in accordance with some embodiments of the present disclosure. FIG. 11B is an example response 1120 that may be provided by the generative engine 514 in response to the query 1110 of FIG. 11A. The query/response illustrated in FIGS. 11A and 11B are merely examples, and are not intended to limit the embodiments of the present disclosure.

As illustrated in FIG. 11A, the query 1110 provided to the generative engine 514 may be of the form "Given a SQL table with columns: <data listing table columns> and another table with columns <user table columns> provide a SQL query using both tables." As illustrated in FIG. 11B, the generative engine 514 may automatically (e.g., through the use of the LLM 510) respond with a response 1120. In the example of FIG. 11B, the response 1120 includes both an example SQL query as well as an explanation of the various parts of the SQL query, including its output. In some embodiments, the database information for the tables of the data listing 423 may be acquired from the data listing 423. In some embodiments, the database information for the tables of the user may be acquired by the exchange manager 124 (e.g., as part of examining the user database) or as provided by the user. The example provided in the response 1120 may be generated by the generative engine 514 through the use of the LLM 510. In some embodiments, the contents of the response 1120 may be provided as part of the listing explanation 916.

FIG. 12A is an example query 1210 that may be provided to the generative engine 514 to generate a usage example for inclusion in the listing explanation 916 of FIG. 9, in accordance with some embodiments of the present disclosure. FIG. 12B is an example response 1220 that may be provided by the generative engine 514 in response to the query 1210 of FIG. 12A. The query/response illustrated in FIGS. 12A and 12B are merely examples, and are not intended to limit the embodiments of the present disclosure.

The examples of FIGS. 12A and 12B are largely similar to those of FIGS. 11A and 11B, with the exception that the query 1210 provided to the generative engine 514 includes the option that no other explanation or text be provided with the sample SQL statement. As illustrated in FIG. 11B, the generative engine 514 may automatically (e.g., through the use of the LLM 510) respond with a response 1220 that includes just the sample SQL statement.

Referring back to FIG. 6B, in block 606, the results, as adjusted by the data listing signals, along with the listing explanation 916 may be provided in response to the search query 502. In some embodiments, the results may be transmitted to the user who provided the search query 502. In some embodiments, the ranking results may be provided as part of user interface that is generated, which may be displayed to the user who provided the search query 502. Examples of possible user interfaces will be described further herein.

Figure 13:
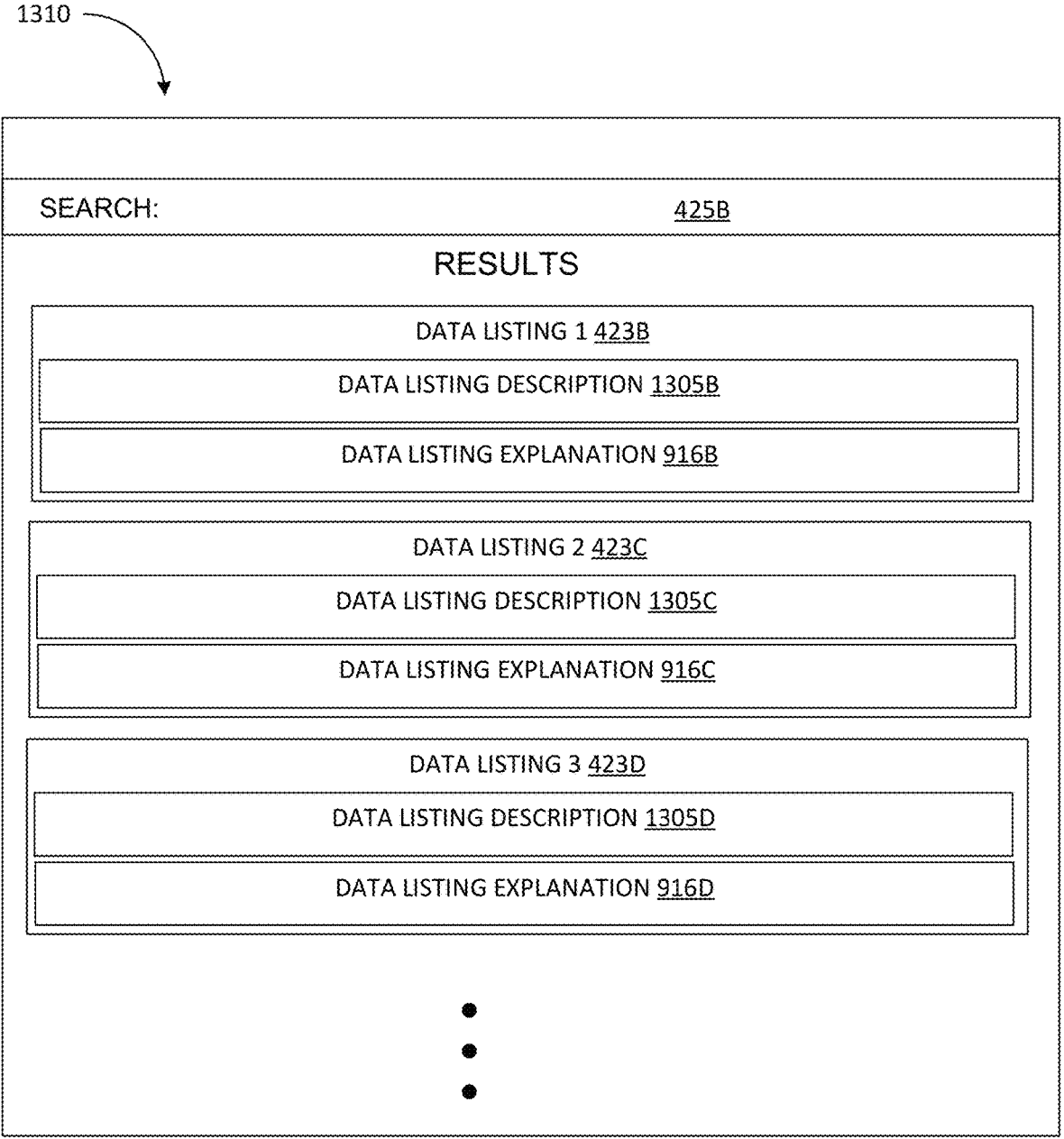
FIG. 13 is an example user interface according to some embodiments of the present disclosure.

FIG. 13 is an example user interface 1300 according to some embodiments of the present disclosure. A description of elements of FIG. 13 that have been previously described will be omitted for brevity. FIG. 13 illustrates an example user interface 1300 in which the results of the search operation of the data listings 423 are presented. As illustrated in FIG. 13, the user interface 1300 may include the search bar 425B from which the user entered the original search query 502, but embodiments of the present disclosure are not limited to this configuration.

In addition, the user interface 1300 may include a plurality of data listings 423 (423B, 423C, 423D are illustrated) that may be the relevant results in response to the search query 502. In some embodiments, the plurality of data listings 423 may be listed in order of relevance. For example, the most relevant data listing 423, as determined based on the LLM 510 as described herein, may be listed first, the second-most relevant data listing 423 may be listed second, and so on.

Each listing may include a data listing description 1305 (1305B, 1305C, 1305D are illustrated). In some embodiments, the data listing description 1305 may be taken from information maintained within the data listings 423. In some embodiments, the data listing description 1305 may be or include a summarized view of the contents of the data listing 423.

In some embodiments, each listing may also include the listing explanation 916 (916B, 916C, 916D are illustrated). The listing explanation 916 may describe the relevance of the particular result to the search query 502, and may be generated as described herein with respect to FIGS. 9, 10A, and 10B. In some embodiments, the listing explanation 916 may include examples for how to utilize the data listing 423, as described herein with respect to FIGS. 11A, 11B, 12A, and 12B.

FIG. 6C is a flow diagram of an additional method 620 of ranking search results, according to some embodiments of the present disclosure. A description of elements of FIG. 6C that have been previously described will be omitted for brevity. Method 620 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 620 may be performed by a computing device (e.g., exchange manager 124).

With reference to FIG. 6C, method 620 illustrates example functions used by various embodiments. Although specific function blocks ("blocks") are disclosed in method 620, such blocks are examples. That is, embodiments are well suited to performing various other blocks or variations of the blocks recited in method 620. It is appreciated that the blocks in method 620 may be performed in an order different than presented, and that not all of the blocks in method 620 may be performed.

Blocks 601 through 605 of method 620 are the same or similar to those described herein with respect to 6A and, as a result, a description thereof will be omitted. Block 611 of method 620 is the same or similar to that described herein with respect to 6B and, as a result, a description thereof will be omitted. Referring simultaneously to FIGS. 2, 3, 4A, 4B, 5, 6A, and 6B as well, the method 620 may proceed with block 621 in which result insights may be generated. Result insights may be a summarization of the results of the search query 502 and/or an answer to a question posted by the search query 502.

Figure 14A:
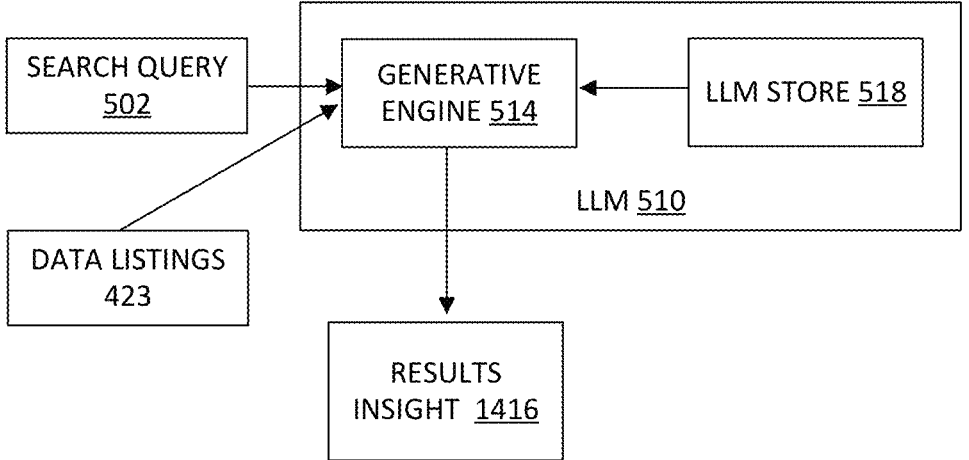
FIG. 14A is a schematic block diagram illustrating the generation of a results insight from a set of data listings and a search query utilizing an LLM, in accordance with some embodiments of the present disclosure.

FIG. 14A is a schematic block diagram illustrating the generation of a results insight 1416 from a set of data listings 423 and a search query 502 utilizing an LLM 510, in accordance with some embodiments of the present disclosure. A description of elements of FIG. 14A that have been previously described will be omitted for brevity.

In some embodiments, the results insight 1416 may be a synthesized answer which summarizes the results to the search query 502. For example, if the user provides a search query 502 in the form of a conversational query, the LLM 510 provides the answer and related questions as part of the results insight 1416. For keyword queries, the LLM 510 may suggest the top resources (i.e. datasets) and related queries, if available, as part of the results insight 1416.

Referring to FIG. 14A, the generative engine 514 may be provided with both the search query 502 as well as the plurality of retrieved data listings 423 that were provided as results to the search query 502. This information may be provided to the generative engine 514 with a prompt to generate a relevance between the provided search query 502 and the result data listings 423. Utilizing the LLM store 518, the generative engine 514 may generate the results insight 1416 based on perceived syntactical and/or semantic similarities between the search query 502 and the data listing results 423.

The use of the results insight 1416 generated by the LLM 510 may be used to provide further conversational support to the user. After the user issues a conversational search query 502, the LLM 510 may provide the related answer and/or produce the SQL string to find the answer over a dataset. In some embodiments, this can be done in a single prompt by providing the generative engine 514 of the LLM 510 with all the relevant information about the data listings 423 returned to the search query 502 together with the user search query 502, and prompting the generative engine 514 of the LLM 510 to provide an example SQL string or the answer as part of the results insight 1416.

In some embodiments, the generative engine 514 of the LLM 510 may provide a natural-language description of the summary of results as part of the results insight 1416. For example, if the user's search query 502 was a keyword (e.g. "weather"), the results insight 1416 could be of the form "We found five listings that are relevant to this search" or a more useful "Weather data is used in many verticals to address a wide range of business needs. Weather data is most commonly used for supply chain optimization, demand forecasting, and economic impact analysis." In the latter case, the LLM 510 may be provided with domain-specific (i.e., Search in the Marketplace and data-usage) knowledge. In some embodiments, for both scenarios (keyword and conversational queries) the generative engine 514 of the LLM 510 may search through the existing query-history of the exchange manager and find other related queries and propose a subset of those to the user as part of the results insight 1416.

Referring back to FIG. 6C, in block 622, the results, as adjusted by the data listing signals, along with the listing explanation 916 and the results insight 1416, may be provided in response to the search query 502. In some embodiments, the results may be transmitted to the user who provided the search query 502. In some embodiments, the ranking results may be provided as part of the user interface that is generated, which may be displayed to the user who provided the search query 502.

Figure 14B:
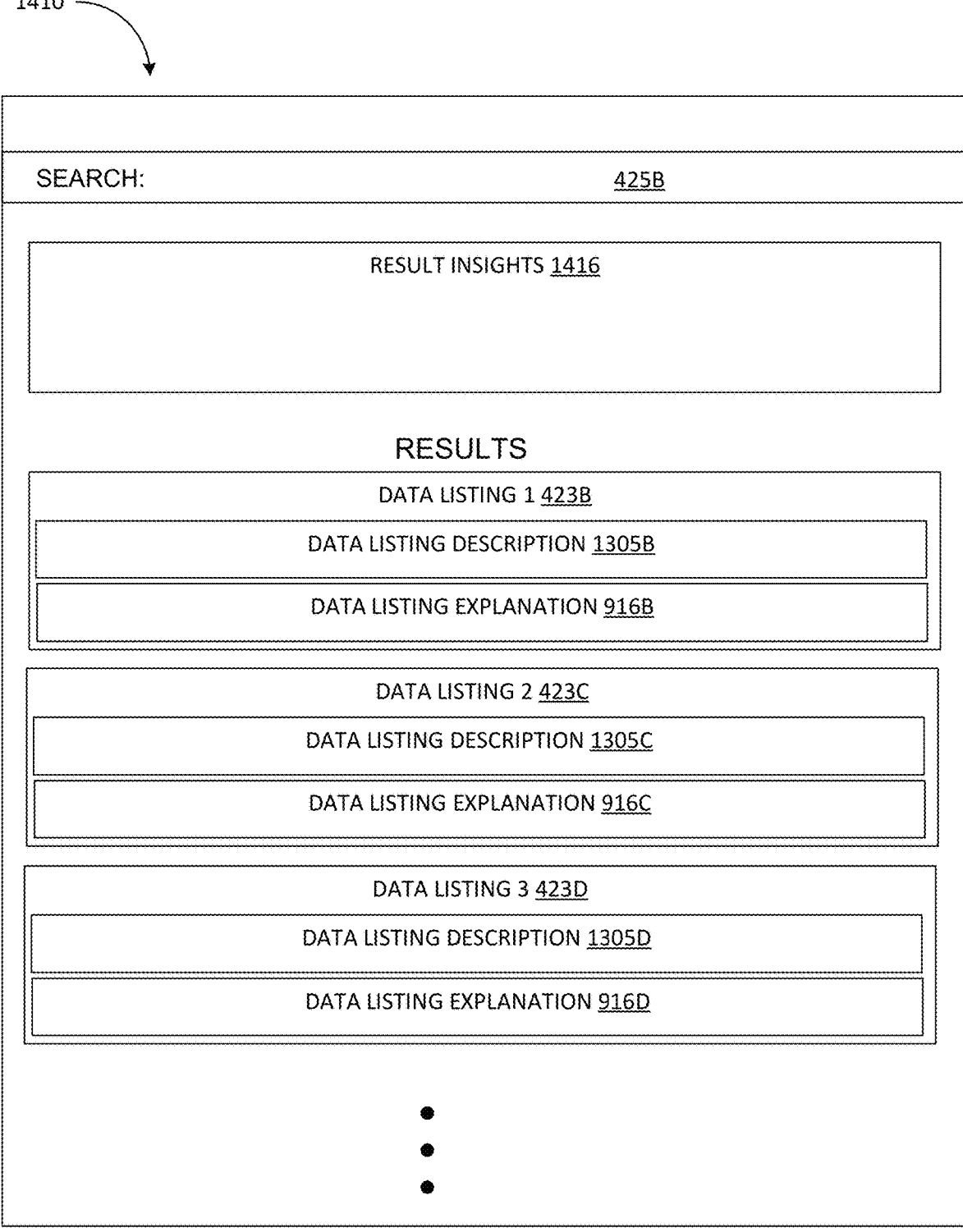
FIG. 14B is an example of another user interface according to some embodiments of the present disclosure.

FIG. 14B is an example of another user interface 1410 according to some embodiments of the present disclosure. A description of elements of FIG. 14B that have been previously described will be omitted for brevity. FIG. 14B illustrates an example user interface 1410 in which the results of the search operation of the data listings 423 are presented in a manner similar to those of FIG. 13 and, as a result, a duplicate description thereof will be omitted. The user interface 1410 differs from the user interface 1300 in that the results insight 1416 determined as described with respect to FIG. 14A may be included at the top of the results within the user interface 1410. The positioning of the results insight 1416 is merely an example and is not intended to limit the embodiments of the present disclosure. In some embodiments, the results insights 1416 may be displayed to one side of the results, or as an overlay on the results, to mention two examples.

Figure 15A:
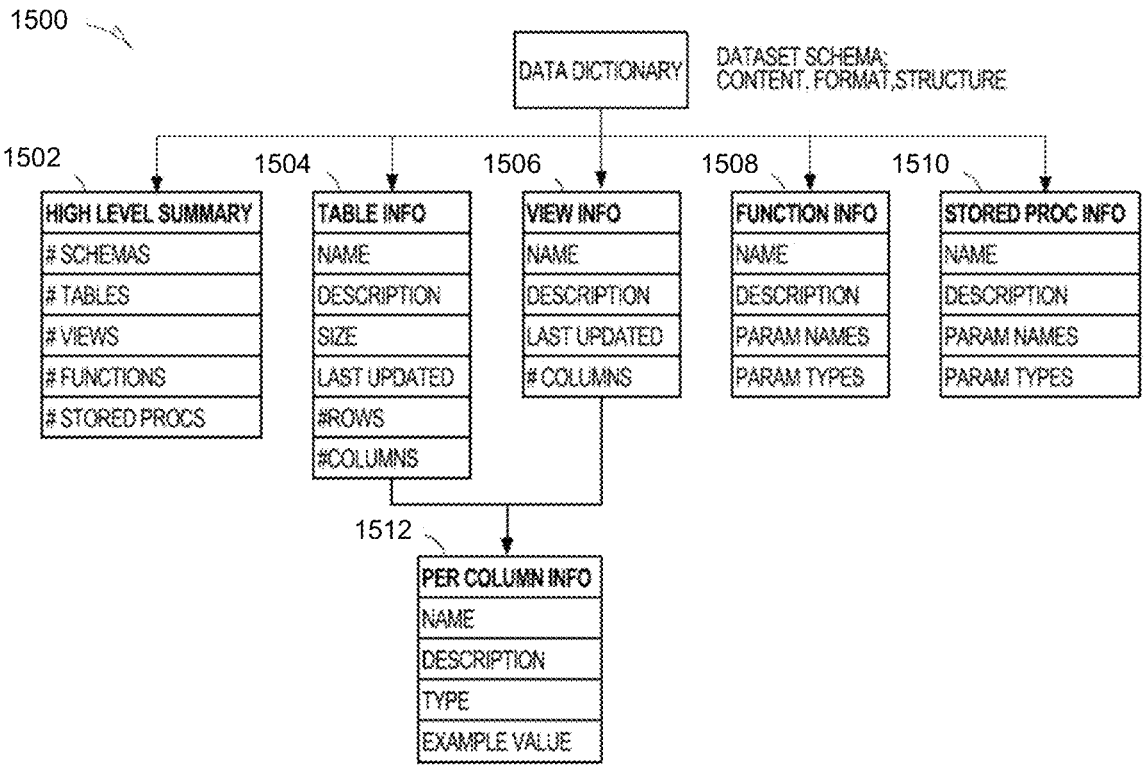
FIG. 15A is a block diagram illustrating a data dictionary schema, in accordance with some embodiments of the present disclosure.

FIG. 15A is a block diagram illustrating a data dictionary schema 1500, in accordance with some embodiments of the present disclosure. As shown, the data dictionary schema 1500 includes a high-level summary 1502 of the shared data provided by the data listing 423, table information 1504 describing the tables included in the shared data, view information 1506 describing views in the shared data, function information 1508 describing functions in the shared data and stored procedure information 1510 describing stored procedures in the shared data. Per column information 1512 is also provided for each table and view in the shared data. As shown, each of the objects includes a set of data fields. For example, the high-level summary information 1502 includes a number of schemas, tables, views, functions and stored procedures in the shared data. The table information 1504 includes a name, description, size, last update, number of rows and number of columns in a table. The view information 1506 includes a name, description, last update and number of columns in the view. The function information 1508 and stored procedure information 1510 both include the name, description, parameter names and parameter types of the function or stored procedure. Similarly, the per column information 1512 includes a name, description, data value type, and example value for each column included in a table or view.

Figure 15B:
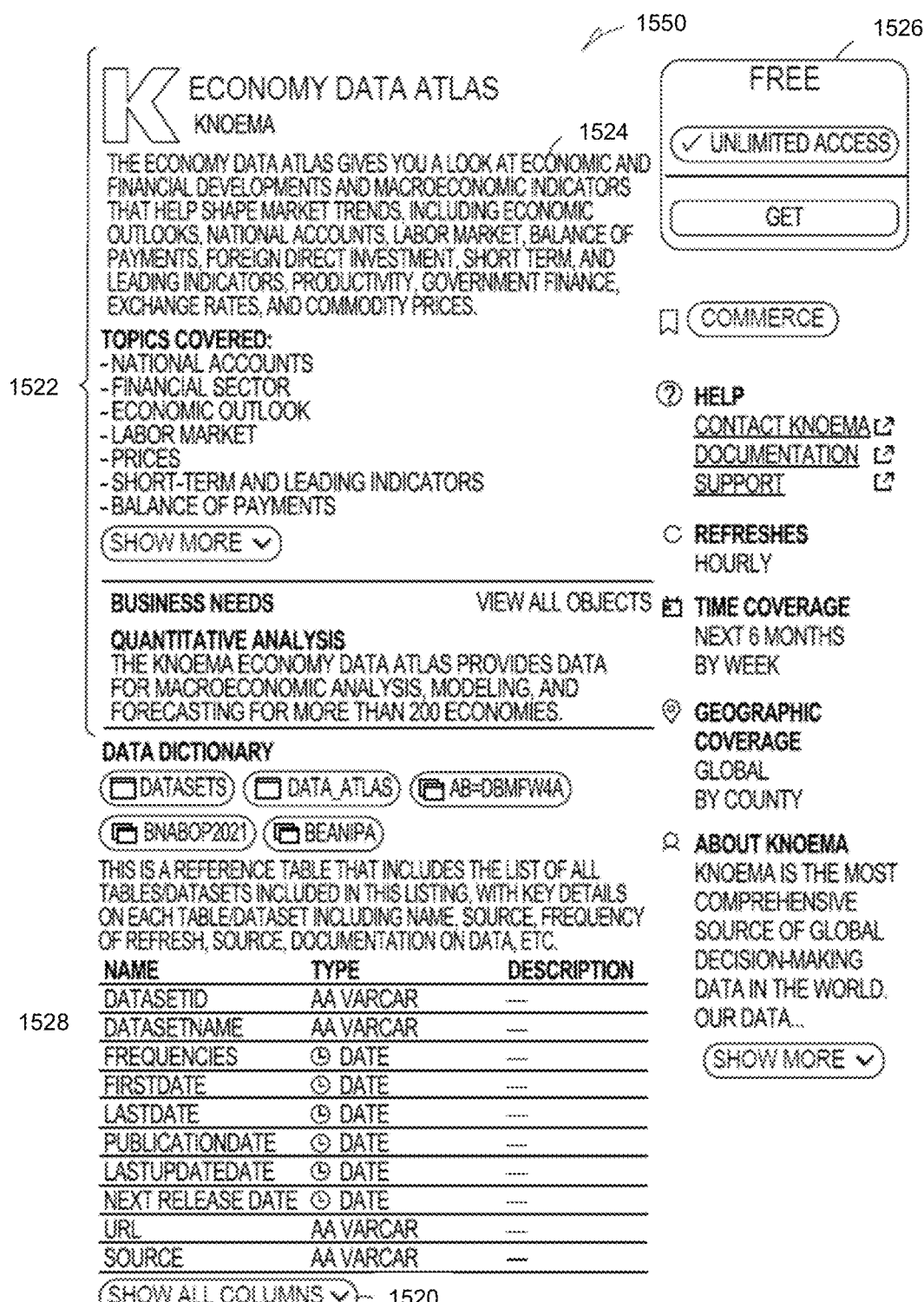
FIG. 15B is a block diagram of a user interface presenting a description of a listing with a data dictionary, in accordance with some embodiments of the present disclosure.

FIG. 15B is a block diagram of a user interface 1550 presenting a description of a listing with a data dictionary, in accordance with some embodiments of the present disclosure. As shown, the user interface 1550 includes a description of the listing 1522, including a written description 1524 and price 1526. Further, the user interface 1550 includes a data dictionary 1528 generated for the listing. The data dictionary 1528 allows a data consumer to view information describing a group of objects included in the shared data, such as tables, views and functions. In some embodiments, a set of featured objects selected by a data provider may be included in the user interface 1550. The user interface 1550 also includes a button 1520 to view additional columns included in a dataset.

The data exchange may generate a data dictionary for each of the data listings 423 (e.g., as they are created and before any of them are retrieved). When providing information for each of the data listings 423 for generation of the embeddings 710, LLM 510 may instead, or additionally, analyze the corresponding data dictionary of the data listing 423. Data dictionaries provide the benefit of having information about the listing's data contents, such as table-names and per-column information, in a readily available and organized manner. Data dictionaries may also contain most of the information needed to compute the embeddings 710 discussed above and some of the data listing signals discussed above as well. Thus, in some embodiments, a data dictionary may contain all of the information needed to compute values for the embeddings and the data listing signals that are in use.

FIG. 16 is a flow diagram of a method 1600 for performing an enhanced data listing ranking using listing-specific and external signals, in accordance with some embodiments of the present disclosure. Method 1600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 1600 may be performed by processing device 405A of exchange manager 124 (illustrated in FIG. 4A).

With reference to FIG. 16, method 1600 illustrates example functions used by various embodiments. Although specific function blocks ("blocks") are disclosed in method 1600, such blocks are examples. That is, embodiments are well suited to performing various other blocks or variations of the blocks recited in method 1600. It is appreciated that the blocks in method 1600 may be performed in an order different than presented, and that not all of the blocks in method 1600 may be performed.

At block 1610, the method 1600 may include receiving a search query comprising a set of search terms. In some embodiments, the search query may be similar to the search query 502 described herein.

At block 1620, the method 1600 may include retrieving a plurality of data listings based on the search terms of the search query. In some embodiments, the plurality of data listings may be similar to the data listings 423 described herein.

At block 1630, the method 1600 may include comparing a first embedding generated by a large language model (LLM) from the search query to second embeddings generated by the LLM for each of the plurality of data listings to determine a respective relevance for each of the plurality of data listings to the search query. In some embodiments, the first embedding may be similar to the search query embedding 810 described herein. In some embodiments, the second embeddings may be similar to the embeddings 710 described herein. In some embodiments, the LLM may be similar to the LLM 510 described herein.

At block 1640, the method 1600 may include ranking the plurality of data listings based on the respective relevance for each of the plurality of data listings to the search query. In some embodiments, the ranking may be similar to the operations performed by the data listing ranking engine 507 described herein.

In some embodiments, the method 1600 may further include generating a description of each of the plurality of data listings utilizing a generative engine of the LLM and providing the description of each of the plurality of the data listings to the LLM to generate the second embeddings. In some embodiments, the generative engine may be similar to the generative engine 514 described herein. In some embodiments, providing the description of each of the plurality of the data listings to the LLM to generate the second embedding may be similar to the operations described herein with respect to FIGS. 7A and 7B.

In some embodiments, the ranking of the plurality of data listings is further based on data listing signals associated with each of the plurality of data listings. In some embodiments, the ranking of the plurality of data listings further based on data listing signals associated with each of the plurality of data listings may be similar to operations described herein with respect to the data signal engine 542. In some embodiments, the data listing signals associated with each of the plurality of data listings comprise one or more of: a popularity score of the data listing, a click-through rate of the data listing, account-specific data corresponding to an account that issued the search query, and user-specific data of a user that issued the search query.

In some embodiments, the method 1600 further includes providing data related to the plurality of data listings and the search query to a generative engine of the LLM to generate a listing explanation for each of the plurality of data listings that explains, for each respective data listing of the plurality of data listings, a relevance of the respective data listing to the search query. In some embodiments, the generative engine may be similar to the generative engine 514 described herein. In some embodiments, the listing explanation may be similar to the listing explanation 916 described herein. In some embodiments, generating the listing explanation for each of the plurality of data listing may be similar to the operations described herein with respect to FIGS. 9 to 12B. In some embodiments, the listing explanation includes a sample query that utilizes the data listing. In some embodiments, the sample query further utilizes a database associated with a user that provided the search query.

In some embodiments, the method 1600 further includes providing data related to the plurality of data listings and the search query to a generative engine of the LLM to generate a results insight that provides a summary of the plurality of data listings. In some embodiments, the generative engine may be similar to the generative engine 514 described herein. In some embodiments, the results insight may be similar to the results insight 1416 described herein with respect to FIGS. 14A and 14B. In some embodiments, the results insight further comprises a related query based on the search query and the plurality of data listings.

In some embodiments, the method 1600 further includes generating a data dictionary for each of the plurality of data listings, the data dictionary for each of the plurality of data listings comprising metadata describing data shared by the data listing and metadata describing individual objects included in the data shared by the data listing. In some embodiments, the second embeddings generated by the LLM for each of the plurality of data listings are generated based on the respective data dictionary of the plurality of data listings. In some embodiments, generating and utilizing the data dictionary may be similar to the operations described herein with respect to FIGS. 15A and 15B.

Figure 17:
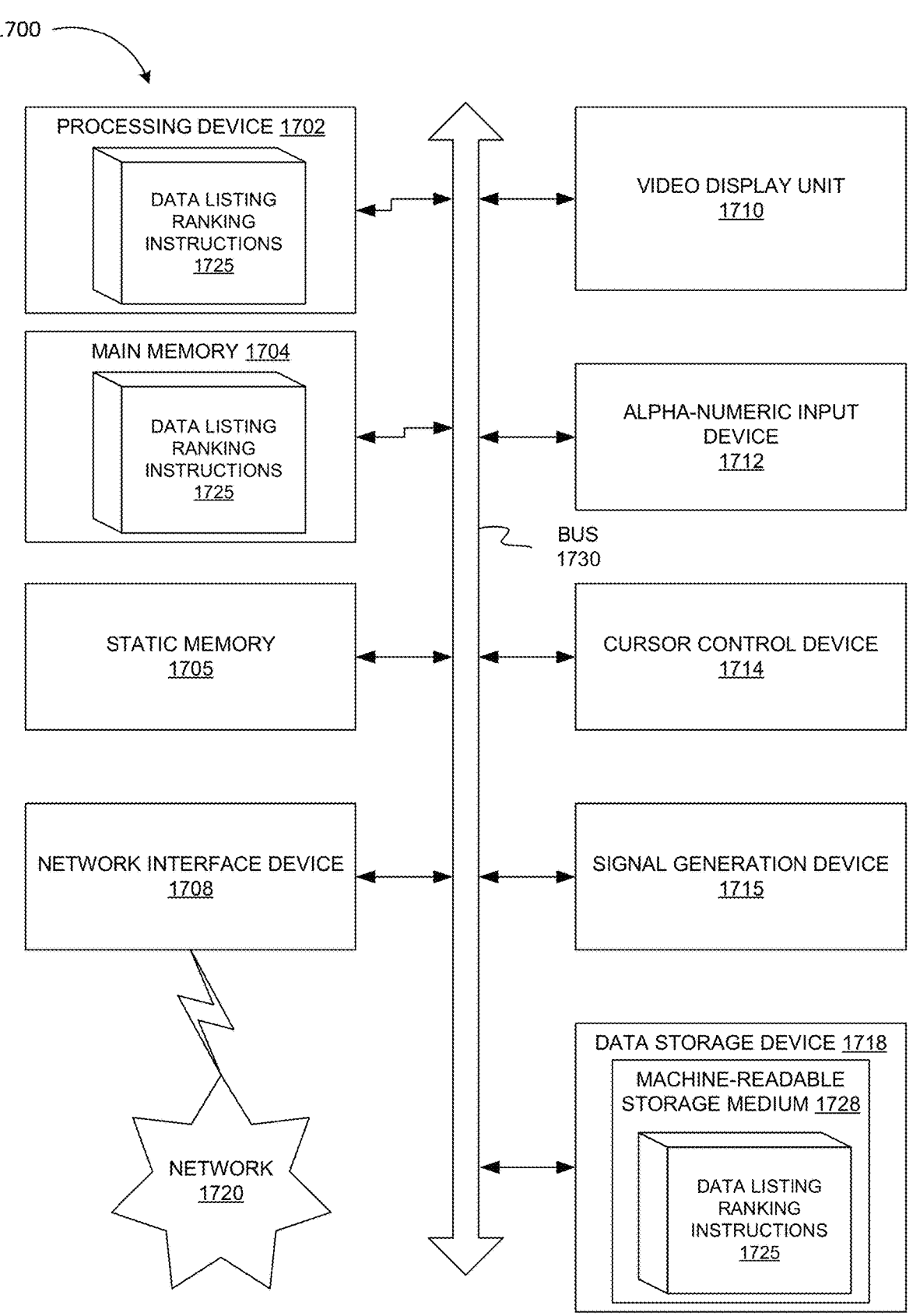
FIG. 17 is a block diagram of an example computing device that may perform one or more of the operations described herein, in accordance with some embodiments of the present disclosure.

FIG. 17 illustrates a diagrammatic representation of a machine in the example form of a computer system and/or device 1700 within which a set of instructions, for ranking retrieved data listings based on what is relevant to both the query and the user by analyzing listing-specific and external signals of retrieved data listings, as discussed in further detail herein.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1700 may be representative of a server.

The exemplary computer system 1700 includes a processing device 1702, a main memory 1704 (e.g., read-only memory (ROM), flash memory, dynamic random access memory (DRAM)), a static memory 1705 (e.g., flash memory, static random access memory (SRAM), etc.), and a data storage device 1718, which communicate with each other via a bus 1730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 1700 may further include a network interface device 1708 which may communicate with a network 1720. The computing device 1700 also may include a video display unit 1710 (e.g., a liquid crystal display (LCD) or a cathode ray tube (CRT)), an alphanumeric input device 1712 (e.g., a keyboard), a cursor control device 1714 (e.g., a mouse) and an acoustic signal generation device 1715 (e.g., a speaker). In one embodiment, video display unit 1710, alphanumeric input device 1712, and cursor control device 1714 may be combined into a single component or device (e.g., an LCD touch screen).

Processing device 1702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1702 may also be one or more special-purpose processing devices such as an application specific integrated circuit (ASIC), a field programmable gate array (FPGA), a digital signal processor (DSP), network processor, or the like. The processing device 1702 is configured to execute data listing ranking instructions 1725, for performing the operations and steps discussed herein.

The data storage device 1718 may include a machine-readable storage medium 1728, on which is stored one or more sets of data listing ranking instructions 1725 (e.g., software) embodying any one or more of the methodologies of functions described herein. The data listing ranking instructions 1725 may also reside, completely or at least partially, within the main memory 1704 or within the processing device 1702 during execution thereof by the computer system 1700; the main memory 1704 and the processing device 1702 also constituting machine-readable storage media. The data listing ranking instructions 1725 may further be transmitted or received over a network 1720 via the network interface device 1708.

The machine-readable storage medium 1728 may also be used to store instructions to perform the methods described herein. While the machine-readable storage medium 1728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "retrieving," "comparing," "ranking," "generating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the embodiments of the present disclosure are not to be limited to the details given herein, but may be modified within the scope and equivalents of the appended claims.

What is claimed is:

1. A method comprising:
receiving a search query comprising a set of search terms;
retrieving a plurality of data listings based on the search terms of the search query, merging the plurality of data listings to eliminate duplicates;
comparing, by a processing device, a first embedding generated by a large language model (LLM) from the search query to second embeddings generated by the LLM for each of the plurality of data listings, the second embeddings filtered according to a nearest-neighbors search to eliminate multiple instances of similar data listings of the plurality of data listings based at least on a weighting strategy, wherein the weighting strategy combines a scoring of elements of the similar data listings of the plurality of data listings to rank the plurality of data listings, wherein a top rank listing is maintained and the similar data listings remaining include relevance information that are listed as less relevant in view of the top rank listing, such that the similar data listings remaining are listed as less relevant by the processing device or are eliminated, and wherein the second embeddings include database schema information associated with the data listings, the database schema information comprising at least one of a schema name, a table name, or a column name, to determine a respective relevance for each of the plurality of data listings to the search query; and
ranking the plurality of data listings based on the respective relevance for each of the plurality of data listings to the search query.

2. The method of claim 1, further comprising:
generating a description of each of the plurality of data listings utilizing a generative engine of the LLM; and
providing the description of each of the plurality of the data listings to the LLM to generate the second embeddings.

3. The method of claim 1, wherein the ranking of the plurality of data listings is further based on data listing signals associated with each of the plurality of data listings.

4. The method of claim 3, wherein the data listing signals associated with each of the plurality of data listings comprise one or more of: a popularity score of the data listing, a click-through rate of the data listing, account-specific data corresponding to an account that issued the search query, and user-specific data of a user that issued the search query.

5. The method of claim 1, further comprising:
providing data related to the plurality of data listings and the search query to a generative engine of the LLM to generate a listing explanation for each of the plurality of data listings that explains, for each respective data listing of the plurality of data listings, a relevance of the respective data listing to the search query.

6. The method of claim 5, wherein the listing explanation includes a sample query that utilizes the data listing.

7. The method of claim 6, wherein the sample query further utilizes a database associated with a user that provided the search query.

8. The method of claim 1, further comprising:
providing data related to the plurality of data listings and the search query to a generative engine of the LLM to generate a results insight that provides a summary of the plurality of data listings.

9. The method of claim 8, wherein the results insight further comprises a related query based on the search query and the plurality of data listings.

10. The method of claim 1, further comprising:
generating a data dictionary for each of the plurality of data listings, the data dictionary for each of the plurality of data listings comprising metadata describing data shared by the data listing and metadata describing individual objects included in the data shared by the data listing,
wherein the second embeddings generated by the LLM for each of the plurality of data listings are generated based on the respective data dictionary of the plurality of data listings.

11. A system comprising:
a memory; and
a processing device operatively coupled to the memory, the processing device to:
receive a search query comprising a set of search terms;
retrieve a plurality of data listings based on the search terms of the search query, merging the plurality of data listings to eliminate duplicates;
compare a first embedding generated by a large language model (LLM) from the search query to second embeddings generated by the LLM for each of the plurality of data listings, the second embeddings filtered according to a nearest-neighbors search to eliminate multiple instances of similar data listings of the plurality of data listings based at least on a weighting strategy, wherein the weighting strategy combines a scoring of elements of the similar data listings of the plurality of data listings to rank the plurality of data listings, wherein a top rank listing is maintained and the similar data listings remaining include relevance information that are listed as less relevant in view of the top rank listing, such that the similar data listings remaining are listed as less relevant or are eliminated, and wherein the second embeddings include database schema information associated with the data listings, the database schema information comprising at least one of a schema name, a table name, or a column name, to determine a respective relevance for each of the plurality of data listings to the search query; and rank the plurality of data listings based on the respective relevance for each of the plurality of data listings to the search query.

12. The system of claim 11, wherein the processing device is further to:

generate a description of each of the plurality of data listings utilizing a generative engine of the LLM; and provide the description of each of the plurality of the data listings to the LLM to generate the second embeddings.

13. The system of claim 11, wherein the processing device is to rank the plurality of data listings further based on data listing signals associated with each of the plurality of data listings.

14. The system of claim 13, wherein the data listing signals associated with each of the plurality of data listings comprise one or more of: a popularity score of the data listing, a click-through rate of the data listing, account-specific data corresponding to an account that issued the search query, and user-specific data of a user that issued the search query.

15. The system of claim 11, wherein the processing device is further to:

provide data related to the plurality of data listings and the search query to a generative engine of the LLM to generate a listing explanation for each of the plurality of data listings that explains, for each respective data listing of the plurality of data listings, a relevance of the respective data listing to the search query.

16. The system of claim 15, wherein the listing explanation includes a sample query that utilizes the data listing.

17. The system of claim 16, wherein the sample query further utilizes a database associated with a user that provided the search query.

18. The system of claim 11, wherein the processing device is further to:

provide data related to the plurality of data listings and the search query to a generative engine of the LLM to generate a results insight that provides a summary of the plurality of data listings.

19. The system of claim 18, wherein the results insight further comprises a related query based on the search query and the plurality of data listings.

20. The system of claim 11, wherein the processing device is further to:

generate a data dictionary for each of the plurality of data listings, the data dictionary for each of the plurality of data listings comprising metadata describing data shared by the data listing and metadata describing individual objects included in the data shared by the data listing, wherein the second embeddings generated by the LLM for each of the plurality of data listings are generated based on the respective data dictionary of the plurality of data listings.

21. A non-transitory computer-readable medium having instructions stored thereon which, when executed by a processing device, cause the processing device to:

receive a search query comprising a set of search terms;

retrieve a plurality of data listings based on the search terms of the search query, merging the plurality of data listings to eliminate duplicates;

compare, by the processing device, a first embedding generated by a large language model (LLM) from the search query to second embeddings generated by the LLM for each of the plurality of data listings, the second embeddings filtered according to a nearest-neighbors search to eliminate multiple instances of similar data listings of the plurality of data listings based at least on a weighting strategy, wherein the weighting strategy combines a scoring of elements of the similar data listings of the plurality of data listings to rank the plurality of data listings, wherein a top rank listing is maintained and the similar data listings remaining include relevance information that are listed as less relevant in view of the top rank listing, such that the similar data listings remaining are listed as less relevant by the processing device or are eliminated, and wherein the second embeddings include database schema information associated with the data listings, the database schema information comprising at least one of a schema name, a table name, or a column name, to determine a respective relevance for each of the plurality of data listings to the search query; and rank the plurality of data listings based on the respective relevance for each of the plurality of data listings to the search query.

22. The non-transitory computer-readable medium of claim 21, wherein the processing device is further to:

generate a description of each of the plurality of data listings utilizing a generative engine of the LLM; and provide the description of each of the plurality of the data listings to the LLM to generate the second embeddings.

23. The non-transitory computer-readable medium of claim 21, wherein the processing device is to rank the plurality of data listings further based on data listing signals associated with each of the plurality of data listings.

24. The non-transitory computer-readable medium of claim 23, wherein the data listing signals associated with each of the plurality of data listings comprise one or more of: a popularity score of the data listing, a click-through rate of the data listing, account-specific data corresponding to an account that issued the search query, and user-specific data of a user that issued the search query.

25. The non-transitory computer-readable medium of claim 21, wherein the processing device is further to:

provide data related to the plurality of data listings and the search query to a generative engine of the LLM to generate a listing explanation for each of the plurality of data listings that explains, for each respective data listing of the plurality of data listings, a relevance of the respective data listing to the search query.

26. The non-transitory computer-readable medium of claim 25, wherein the listing explanation includes a sample query that utilizes the data listing.

27. The non-transitory computer-readable medium of claim 26, wherein the sample query further utilizes a database associated with a user that provided the search query.

28. The non-transitory computer-readable medium of claim 21, wherein the processing device is further to:

provide data related to the plurality of data listings and the search query to a generative engine of the LLM to generate a results insight that provides a summary of the plurality of data listings.

29. The non-transitory computer-readable medium of claim 28, wherein the results insight further comprises a related query based on the search query and the plurality of data listings.

30. The non-transitory computer-readable medium of claim 21, wherein the processing device is further to:

generate a data dictionary for each of the plurality of data listings, the data dictionary for each of the plurality of data listings comprising metadata describing data shared by the data listing and metadata describing individual objects included in the data shared by the data listing, wherein the second embeddings generated by the LLM for each of the plurality of data listings are generated based on the respective data dictionary of the plurality of data listings.

* * * * *